US008678908B2

(12) United States Patent
Nicely

(10) Patent No.: US 8,678,908 B2
(45) Date of Patent: Mar. 25, 2014

(54) GAMING SYSTEM, GAMING DEVICE, AND METHOD PROVIDING MODIFIERS FOR SYMBOL DISPLAY AREAS

(75) Inventor: Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 138 days.

(21) Appl. No.: 13/237,448

(22) Filed: Sep. 20, 2011

(65) Prior Publication Data

US 2013/0072282 A1 Mar. 21, 2013

(51) Int. Cl.
*A63F 9/24* (2006.01)
*A63F 13/00* (2006.01)
*G06F 17/00* (2006.01)

(52) U.S. Cl.
USPC .................................. 463/20; 463/16; 463/25

(58) Field of Classification Search
USPC ................................................ 463/16–20, 25
See application file for complete search history.

(56) References Cited

U.S. PATENT DOCUMENTS

| | | | | |
|---|---|---|---|---|
| 5,152,529 | A | 10/1992 | Okada | |
| 5,431,408 | A | 7/1995 | Adams | |
| 5,542,669 | A | 8/1996 | Charron et al. | |
| 5,833,537 | A * | 11/1998 | Barrie | 463/21 |
| 5,980,384 | A | 11/1999 | Barrie | |
| 6,089,977 | A | 7/2000 | Bennett | |
| 6,120,031 | A | 9/2000 | Adams | |
| 6,251,013 | B1 | 6/2001 | Bennett | |
| 6,311,976 | B1 | 11/2001 | Yoseloff et al. | |
| 6,322,078 | B1 | 11/2001 | Adams | |
| 6,375,570 | B1 | 4/2002 | Poole | |
| 6,439,993 | B1 | 8/2002 | O'Halloran | |
| 6,443,452 | B1 | 9/2002 | Brune | |
| 6,494,454 | B2 | 12/2002 | Adams | |
| 6,561,900 | B1 | 5/2003 | Baerlocher et al. | |
| 6,565,433 | B1 | 5/2003 | Baerlocher et al. | |
| 6,604,740 | B1 | 8/2003 | Singer et al. | |
| 6,612,927 | B1 | 9/2003 | Slomiany et al. | |
| 6,731,313 | B1 | 5/2004 | Kaminkow | |
| 6,780,109 | B2 | 8/2004 | Kaminkow | |

(Continued)

FOREIGN PATENT DOCUMENTS

WO WO 2007/018680 2/2007

OTHER PUBLICATIONS

International Search Report and Written Opinion of the International Searching Authority for corresponding PCT Application No. PCT/US2012/053321, dated Nov. 23, 2012 (12 pages).

*Primary Examiner* — David L Lewis
*Assistant Examiner* — Shauna-Kay Hall
(74) *Attorney, Agent, or Firm* — Neal, Gerber & Eisenberg LLP

(57) ABSTRACT

A gaming system, gaming device, and method providing a game providing modifiers for symbol display areas. Symbols are generated at symbol display areas. If a symbol display area displaying a symbol included in a displayed designated winning symbol combination is associated with an existing modifier, the gaming system modifies any award associated with that displayed designated winning symbol combination using the existing modifier and associates another different modifier with that symbol display area for a subsequent play of the game. In one embodiment the different modifier is a more favorable modifier. If none of the symbol display areas displaying the symbols included in a displayed designated winning symbol combination are associated with an existing modifier, the gaming system associates a modifier with a symbol display area for a subsequent play of the game.

32 Claims, 21 Drawing Sheets

(56) References Cited

U.S. PATENT DOCUMENTS

| | | | |
|---|---|---|---|
| 6,786,818 B1 | 9/2004 | Rothschild et al. | |
| 6,805,344 B2 | 10/2004 | Abe et al. | |
| 6,851,349 B2 | 2/2005 | Dohallow | |
| 6,866,583 B2 | 3/2005 | Glavich et al. | |
| 6,905,406 B2 | 6/2005 | Kaminkow et al. | |
| 6,905,408 B2 | 6/2005 | Inoue | |
| 6,913,532 B2 | 7/2005 | Baerlocher et al. | |
| 6,921,335 B2 | 7/2005 | Rodgers et al. | |
| 6,955,600 B2 | 10/2005 | Glavich et al. | |
| 6,981,635 B1 | 1/2006 | Hughs-Baird et al. | |
| 6,988,947 B2 | 1/2006 | Baerlocher et al. | |
| 7,014,559 B1 | 3/2006 | Fong | |
| 7,056,213 B2 | 6/2006 | Ching et al. | |
| 7,070,502 B1 | 7/2006 | Bussick et al. | |
| 7,070,503 B2 | 7/2006 | Rudolph | |
| 7,074,127 B2 | 7/2006 | Cuddy et al. | |
| 7,090,580 B2 | 8/2006 | Rodgers et al. | |
| 7,094,148 B2 | 8/2006 | Baerlocher et al. | |
| 7,115,033 B1 | 10/2006 | Timperley | |
| 7,137,888 B2 | 11/2006 | Glavich et al. | |
| 7,169,042 B2 | 1/2007 | Muir et al. | |
| 7,192,345 B2 | 3/2007 | Muir | |
| 7,195,559 B2 | 3/2007 | Gilmore et al. | |
| 7,237,775 B2 | 7/2007 | Thomas et al. | |
| 7,252,591 B2 | 8/2007 | VanAsdale | |
| 7,258,611 B2 * | 8/2007 | Bigelow et al. | 463/25 |
| 7,331,866 B2 | 2/2008 | Rodgers et al. | |
| 7,371,168 B2 | 5/2008 | Bilyeu et al. | |
| 7,371,170 B2 | 5/2008 | Cregan et al. | |
| 7,381,134 B2 | 6/2008 | Cuddy et al. | |
| 7,396,279 B2 | 7/2008 | Berman et al. | |
| 7,399,225 B2 | 7/2008 | Kaminkow | |
| 7,402,103 B2 | 7/2008 | Baerlocher | |
| 7,704,141 B1 | 4/2010 | Marks et al. | |
| 7,922,575 B2 | 4/2011 | Jankowski | |
| 2002/0082074 A1 | 6/2002 | Bennett | |
| 2003/0203753 A1 | 10/2003 | Muir et al. | |
| 2004/0053676 A1 | 3/2004 | Rodgers | |
| 2005/0037836 A1 | 2/2005 | Gilmore et al. | |
| 2005/0054436 A1 | 3/2005 | Frizzell et al. | |
| 2005/0148384 A1 | 7/2005 | Marks et al. | |
| 2006/0030392 A1 | 2/2006 | Rodgers et al. | |
| 2006/0063584 A1 | 3/2006 | Brill et al. | |
| 2006/0068875 A1 | 3/2006 | Cregan et al. | |
| 2006/0068881 A1 * | 3/2006 | Casey | 463/20 |
| 2006/0068884 A1 | 3/2006 | Baerlocher et al. | |
| 2006/0073876 A1 | 4/2006 | Cuddy | |
| 2006/0084492 A1 | 4/2006 | Baerlocher et al. | |
| 2006/0084494 A1 | 4/2006 | Belger et al. | |
| 2006/0089191 A1 | 4/2006 | Singer et al. | |
| 2006/0142077 A1 * | 6/2006 | Miles et al. | 463/20 |
| 2006/0205469 A1 | 9/2006 | Schultz et al. | |
| 2006/0281525 A1 * | 12/2006 | Borissov | 463/20 |
| 2007/0060248 A1 | 3/2007 | Rodgers et al. | |
| 2007/0281778 A1 | 12/2007 | Bigelow, Jr. et al. | |
| 2008/0108409 A1 | 5/2008 | Cole et al. | |
| 2008/0108411 A1 | 5/2008 | Jensen et al. | |
| 2008/0113704 A1 | 5/2008 | Jackson | |
| 2008/0113735 A1 | 5/2008 | Maya | |
| 2008/0200237 A1 | 8/2008 | Cuddy et al. | |
| 2008/0311973 A1 | 12/2008 | Jaffe | |
| 2009/0111559 A1 * | 4/2009 | Souza et al. | 463/20 |
| 2009/0124326 A1 | 5/2009 | Caputo et al. | |
| 2009/0291741 A1 * | 11/2009 | Schofield | 463/20 |
| 2010/0197377 A1 * | 8/2010 | Aoki et al. | 463/20 |

* cited by examiner

GAMING SYSTEM, GAMING DEVICE, AND METHOD PROVIDING MODIFIERS FOR SYMBOL DISPLAY AREAS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

To increase player enjoyment and excitement, and to increase the popularity of gaming machines and gaming devices, gaming machine manufacturers constantly strive to provide players with new types of gaming machines that attract the player and keep the player entertained. To this end, gaming machine manufacturers attempt to provide the player with more award opportunities and to enhance the awards associated with those award opportunities.

Many gaming machines initiate a single generation and display of symbols in response to a wager by a player. For example, certain gaming machines employ a plurality of reels, wherein the reels each have a plurality of symbols. These gaming machines enable a player to place a wager on one or more paylines associated with symbol positions. For each of the reels, certain of the symbols on that reel are independently generated from the symbols on each of the other reels to provide a combination of symbols. A single activation of the set of reels typically leads to a single display of symbols arranged along the paylines to be evaluated for any awards. If a winning symbol or winning combination of symbols is generated and displayed along a wagered-on payline, an award is provided to the player. If a winning symbol or combination of symbols is not generated and displayed along a wagered on payline, no award is provided to the player for that payline. After any awards are provided for any wagered-on payline or paylines, the play of the game ends.

Improvements to gaming machines have been known to include enhancement of the awards associated with award opportunities. Conventional gaming machines employ different components to enhance a player's outcome in a game. One such component is a modifier. A modifier, such as a multiplier, enables players to obtain larger outcomes, such as larger awards in a game. A multiplier increases the award amount proportionally to the value of the multiplier. For example, a "2×" multiplier pays twice the normal award value. A "3×" multiplier pays three times the normal award value. Therefore, a multiplier can substantially enhance a player's award.

One such use of a modifier is disclosed in U.S. Patent Application Publication No. 2009/0111559, entitled "GAMING SYSTEM AND METHOD FOR PROVIDING DESIGNATED SYMBOL DISPLAY AREAS THAT MODIFY AWARDS." This publication discloses gaming machines and methods of operating gaming machines that include indicator or designator symbols. During a play of a game, a plurality of symbols are generated and displayed at a plurality of symbol display areas. When an indicator or designator symbol is generated and displayed during the play of the game, the indicator or designator symbol indicates at least one symbol display area as a modification symbol display area for a subsequent play of the game. During the subsequent play of the game, a plurality of symbols are generated at the symbol display areas. Any awards associated with symbols displayed in the modification symbol display areas are modified.

Gaming machine manufacturers strive to make gaming machines that provide as much enjoyment and excitement as possible. Providing a game in which a player has multiple opportunities to win an award and potentially large awards such as credits are ways to enhance player enjoyment and excitement. Players are also attracted to gaming machines that provide new game schemes and interactive features including different ways of enhancing awards associated with winning symbol combinations or different types of triggering events. Therefore, to increase player enjoyment and excitement, it is desirable to provide players with new game schemes and features for gaming machines that include new and different ways of providing additional award opportunities, enhancing the awards provided to the players in a game, and keeping the players' interests during game play. A continuing need thus exists to provide new and exciting gaming systems, devices, and methods of operating gamine systems and devices.

SUMMARY

The present disclosure describes various embodiments related to gaming systems, gaming devices, and methods providing a game providing modifiers for symbol display areas. In the game providing modifiers for symbol display areas (referred to herein as "wagering game" or "game"), a designated outcome such as a winning outcome in one play of the game causes a modification of an award in a subsequent play of the game, and this process repeats until a designated outcome such as a winning outcome does not occur in one of the plays of the game.

In various embodiments, the present disclosure is employed in a gaming system providing a slot game that has a plurality of reels, a plurality of different symbols on the reels, a plurality of different winning symbol combinations, and a plurality of different awards associated with the different winning symbol combinations. Certain of the winning symbol combinations are designated winning symbol combinations. The symbols are displayable on the reels at a plurality of different symbol display areas. Each play of the game includes a random generation of a plurality of the symbols and a display of the plurality of randomly generated symbols at the symbol display areas. The gaming system determines, for at least one displayed designated winning symbol combination, whether any of the symbol display areas displaying the symbols included in that displayed designated winning symbol combination are associated with a modifier. If, for at least one displayed designated winning symbol combination, one of the symbol display areas that displays one of the symbols included in that displayed designated winning symbol combination is associated with a modifier, the gaming system: (a) modifies any award associated with that displayed designated winning symbol combination using the modifier, (b) provides the modified award, and (c) associates another different modifier with the symbol display area associated with the modifier for a subsequent play of the game. If, for at least one displayed designated winning symbol combination, none of the symbol display areas displaying the symbols included in that displayed designated winning symbol combination are associated with a modifier, the gaming system: (a) provides any award associated with that displayed designated winning symbol combination, and (b) associates a modifier with one of the symbol display areas for a subsequent play of the game.

In certain of these embodiments, if a modifier is associated with one of the symbol display areas that displays a symbol that is not part of a displayed designated winning symbol combination, the gaming system reduces the modifier for a subsequent play of the wagering game.

In various other embodiments, after randomly generating symbols at the symbol display areas, the gaming system determines whether a modifier is associated with a designated symbol display area. In these embodiments, if a modifier is associated with the designated symbol display area and the designated symbol display area displays a symbol included in a displayed designated winning symbol combination, the gaming system: (a) modifies any award associated with the displayed designated winning symbol combination using the modifier, (b) provides the modified award, and (c) associates another different modifier with the designated one of the symbol display areas for at least one subsequent play of the game. In these embodiment, if no modifier is associated with the designated symbol display area and the designated symbol display area displays a symbol included in a displayed designated winning symbol combination, the gaming system: (a) provides any award associated with the displayed designated winning symbol combination, and (b) associates a modifier with the designated symbol display area for at least one subsequent play of the game.

In certain of these embodiments, if a modifier is associated with the designated symbol display area and the designated symbol display area displays a symbol that is not part of a displayed designated winning symbol combination, the gaming system reduces the modifier for a subsequent play of the wagering game.

Additional features and advantages are described herein, and will be apparent from, the following Detailed Description and the figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the game providing modifiers for symbol display areas of the present disclosure are communicated from the central server to the gaming device in a thick client configuration and computerized instructions for controlling any secondary or bonus games or functions are executed by a central server in a thin client configuration.

Figure 1A:
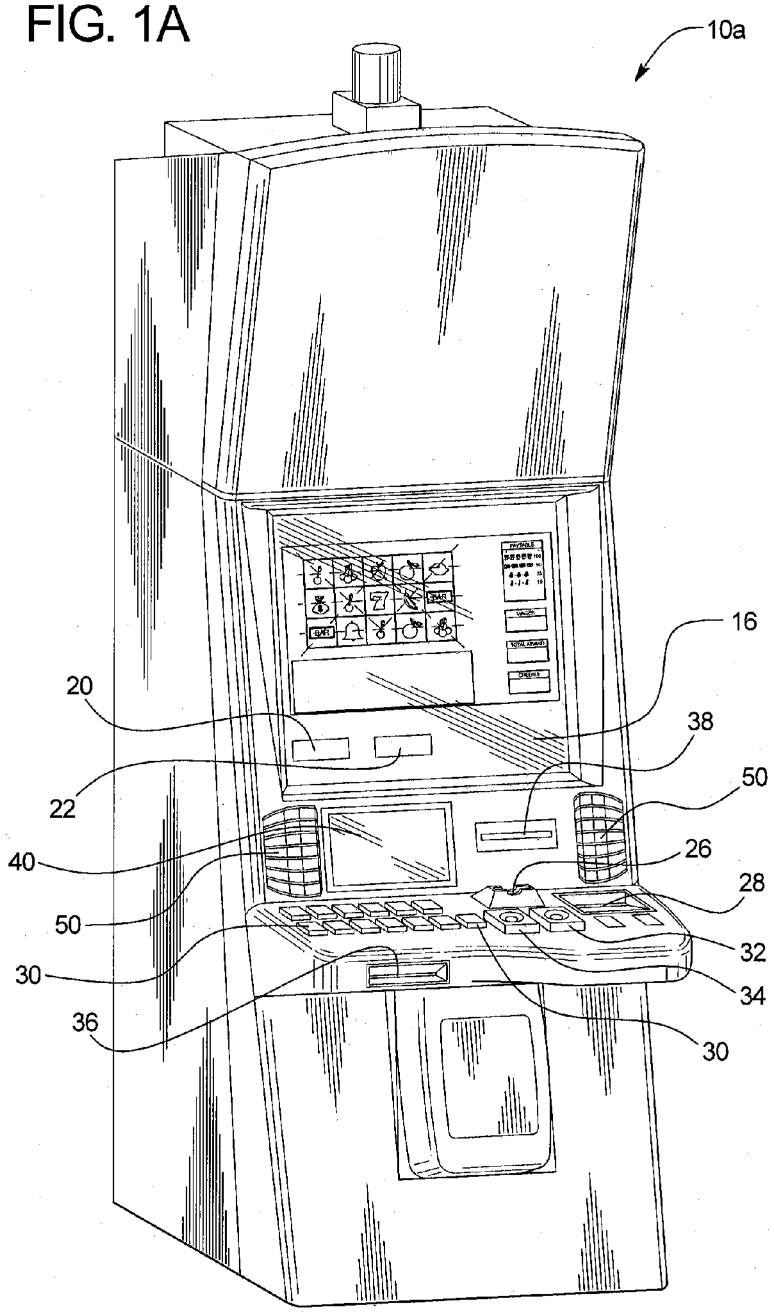
FIGS. 1A and 1B are perspective views of example alternative embodiments of the gaming device of the present disclosure.
Figure 1B:
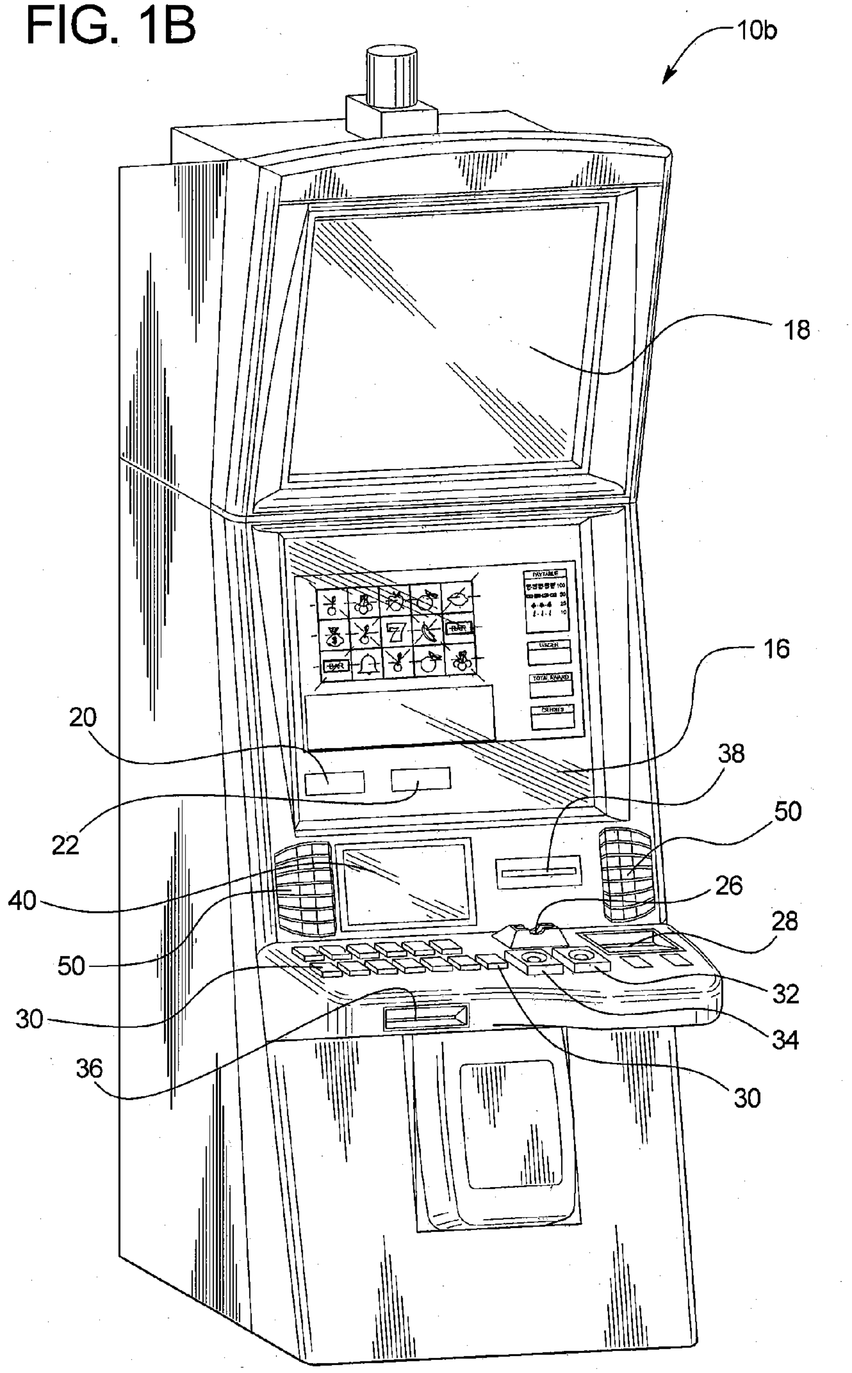

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
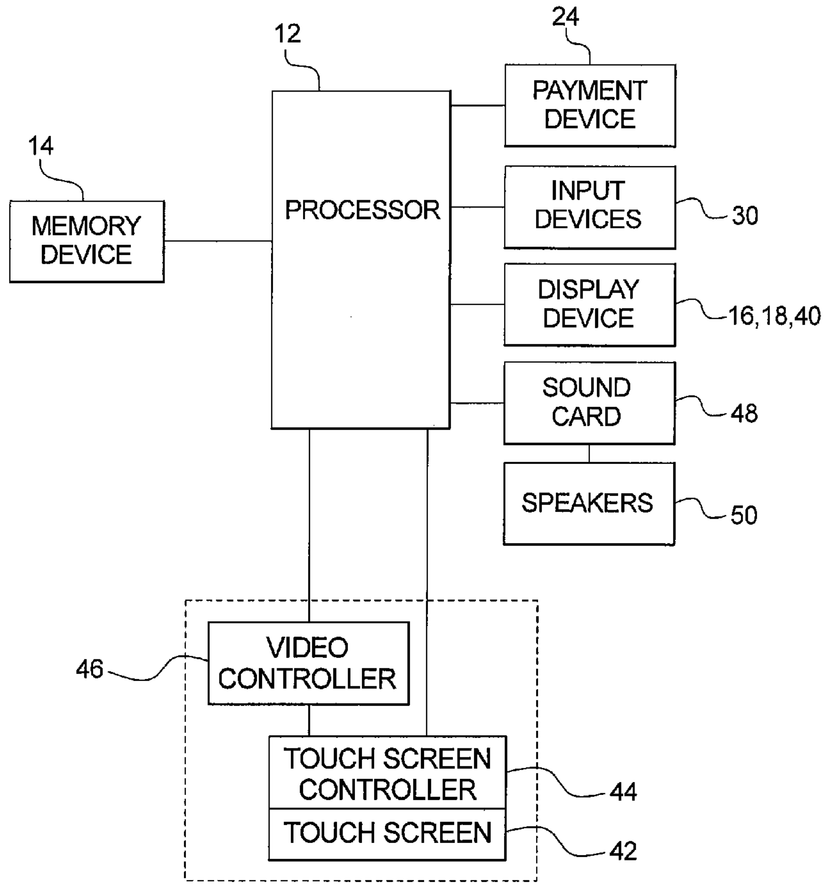
FIG. 2A is a schematic block diagram of one embodiment of an electronic configuration for one of the gaming devices disclosed herein.

In one embodiment, as illustrated in FIG. 2A, the gaming device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, paytable data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays the game providing modifiers for symbol display areas. This display device may also display any suitable secondary or bonus game associated with the game providing modifiers for symbol display areas as well as information relating to the game providing modifiers for symbol display areas or the secondary or bonus game. The alternative embodiment shown in FIG. 1B includes a central display device 16 and an upper display device 18. The upper display device may display the game providing modifiers for symbol display areas, any suitable secondary or bonus game associated or not associated with the game providing modifiers for symbol display areas, and/or information relating to the game providing modifiers for symbol display areas or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the game providing modifiers for symbol display areas or the secondary or bonus game at a location remote from the gaming device.

The display devices may include, without limitation, a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols, or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28 into which the player inserts paper money, a ticket, or a voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the game providing modifiers for symbol display areas or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the game providing modifiers for symbol display areas and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the game providing modifiers for symbol display areas and/or the secondary or bonus game as a game image, symbol, or indicia.

Gaming device 10 incorporates the game providing modifiers for symbol display areas as the primary or base game. It should be appreciated that in certain other embodiments the game providing modifiers for symbol display areas is a secondary or bonus game. The gaming machine or device may include some or all of the features of conventional gaming machines or devices. The gaming device may incorporate any suitable reel-type game, card game, cascading or falling symbol game, number game, or other game of chance susceptible to representation in an electronic or electromechanical form as a secondary or bonus game or feature, which in one embodiment produces, a random outcome based on probability data at the time of or after placement of a wager. That is, different secondary or bonus games, such as video poker games, video blackjack games, video keno games, video bingo games, or video slot games may be implemented.

In one embodiment, the game providing modifiers for symbol display areas and/or the secondary or bonus game include one or more paylines associated with a plurality of symbol display positions. The paylines may be horizontal, vertical, circular, diagonal, angled, or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the game providing modifiers for symbol display areas, the gaming device may also give players the opportunity to win credits in a secondary or bonus game or in a secondary or bonus round. The secondary or bonus game enables the player to obtain a prize or payout in addition to the prize or payout, if any, obtained from the game providing modifiers for symbol display areas. In general, a secondary or bonus game produces a significantly higher level of player excitement than a primary game because it provides a greater expectation of winning than the primary game, and is accompanied with more attractive or unusual features than the primary game. In one embodiment, the secondary or bonus game may be any type of suitable game, either similar to or completely different from the game providing modifiers for symbol display areas.

In one embodiment, the triggering event or qualifying condition may be a selected outcome in the game providing modifiers for symbol display areas or a particular arrangement of one or more indicia on a display device in the game providing modifiers for symbol display areas, such as a BONUS symbol appearing on three adjacent reels along a payline in the game providing modifiers for symbol display areas. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the game providing modifiers for symbol display areas. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the game providing modifiers for symbol display areas.

In one embodiment, the gaming device includes a program that will automatically begin a secondary or bonus round after the player has achieved a triggering event or qualifying condition in the game providing modifiers for symbol display areas. In another embodiment, after a player has qualified for a secondary or bonus game, the player may subsequently enhance his/her secondary or bonus game participation through continued play on the game providing modifiers for symbol display areas. Thus, for each secondary or bonus qualifying event, such as a bonus symbol, that the player obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the game providing modifiers for symbol display areas may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the game providing modifiers for symbol display areas, thus encouraging play of the game providing modifiers for symbol display areas. In another embodiment, qualification of the secondary or bonus game is accomplished through a simple "buy-in" by the player—for example, if the player has been unsuccessful at qualifying through other specified activities. In another embodiment, the player must make a separate side-wager on the secondary or bonus game or wager a designated amount in the game providing modifiers for symbol display areas to qualify for the secondary or bonus game. In this embodiment, the secondary or bonus game triggering event must occur and the side-wager (or designated game providing modifiers for symbol display areas wager amount) must have been placed to trigger the secondary or bonus game.

Figure 2B:
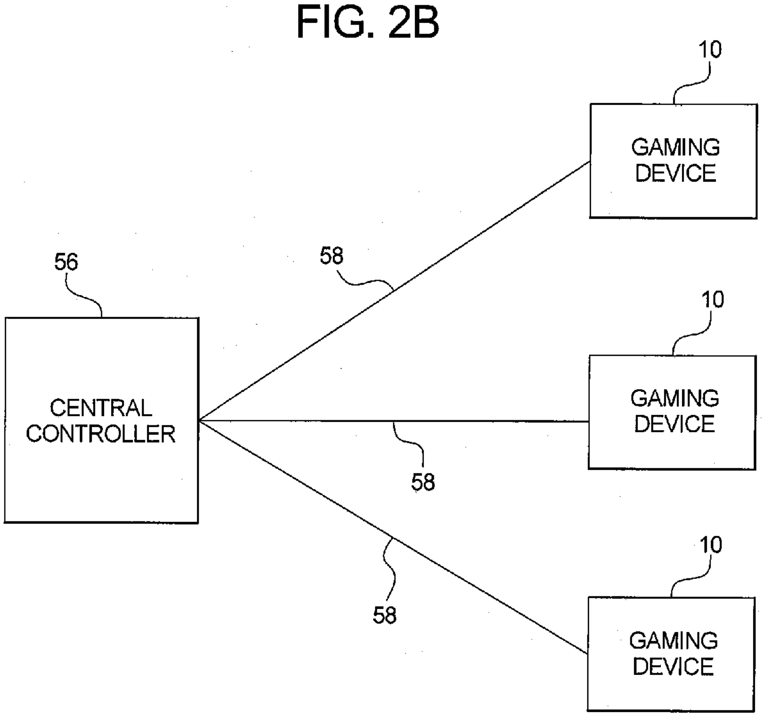
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the game providing modifiers for symbol display areas based on probability data. In another embodiment, the central server or controller randomly generates a game outcome for the secondary or bonus game based on probability data. In another embodiment, the central server or controller randomly generates a game outcome for both the game providing modifiers for symbol display areas and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a game providing modifiers for symbol display areas outcome, a secondary or bonus game outcome, game providing modifiers for symbol display areas and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the game providing modifiers for symbol display areas or the secondary or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first game, and a second gaming device to have selected elements marked in a different predetermined pattern is provided a second outcome of win $2, which will be provided to a second player regardless of how the second player plays a second game. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the game providing modifiers for symbol display areas, a secondary or bonus game, or both. In another embodiment, the game program may be executable as a secondary or bonus game to be played simultaneous with the play of the game providing modifiers for symbol display areas (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the game providing modifiers for symbol display areas may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the game providing modifiers for symbol display areas. That is, a player is provided a progressive award without any explanation or, alternatively, with simple explanations. In another embodiment, a player is provided a progressive award at least partially based on a game triggered or symbol triggered event, such as at least partially based on the play of the game providing modifiers for symbol display areas.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the game providing modifiers for symbol display areas (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the game providing modifiers for symbol display areas of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the game providing modifiers for symbol display areas in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Game Providing Modifiers for Symbol Display Areas

Figure 3:
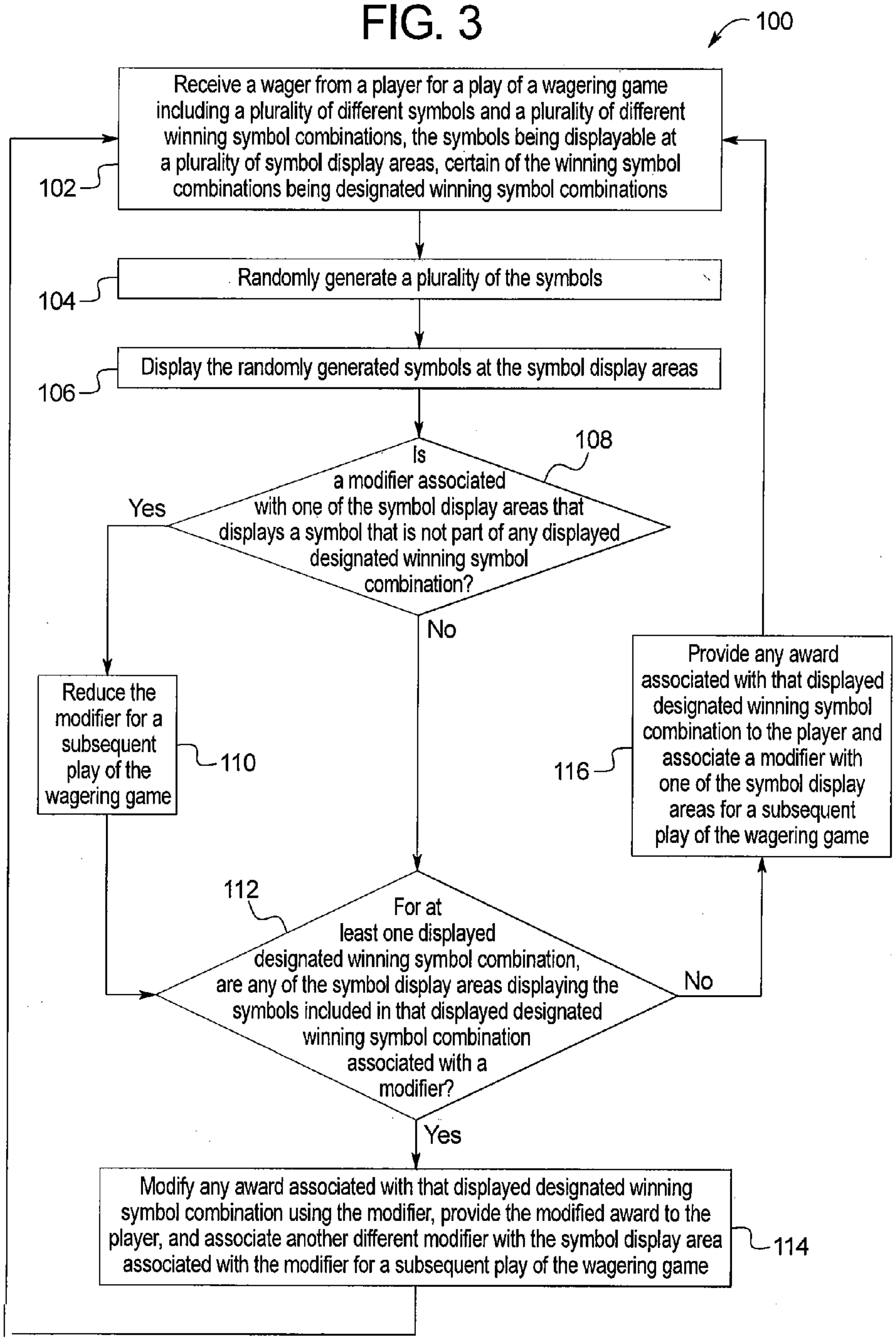
FIG. 3 is a flow chart an example process for operating a gaming system providing the game providing modifiers for symbol display areas disclosed herein.

FIG. 3 illustrates a flowchart of one example embodiment of a process or method 100 for operating a gaming system or a gaming device. In one embodiment, this process 100 is embodied in one or more software programs stored in one or more memories and executed by one or more processors or controllers. Although this process 100 is described with reference to the flowchart shown in FIG. 3, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system receives a wager from a player for a play of a wagering game including a plurality of different symbols and a plurality of different winning symbol combinations, as indicated by block 102. The symbols are displayable at a plurality of symbol display areas. Certain of the winning symbol combinations are designated winning symbol combinations. The gaming system randomly generates a plurality of the symbols, as indicated by block 104. The gaming system displays the randomly generated symbols at the symbol display areas, as indicated by block 106.

The gaming system determines whether a modifier is associated with one of the symbol display areas that displays a symbol that is not part of any displayed designated winning symbol combination, as indicated by diamond 108. If a modifier is associated with one of the symbol display areas that displays a symbol that is not part of a displayed designated winning symbol combination, the gaming system reduces the modifier for a subsequent play of the wagering game, as indicated by block 110.

The gaming system determines, for at least one displayed designated winning symbol combination, whether any of the symbol display areas displaying the symbols included in that displayed designated winning symbol combination are associated with a modifier, as indicated by diamond 112. If, for at least one displayed designated winning symbol combination, one of the symbol display areas that displays one of the symbols included in that displayed designated winning symbol combination is associated with a modifier, the gaming system: (a) modifies any award associated with that displayed designated winning symbol combination using the modifier, (b) provides the modified award to the player, and (c) associates another different modifier with the symbol display area associated with the modifier for a subsequent play of the wagering game, as indicated by block 114. The process then returns to block 102.

If, for at least one displayed designated winning symbol combination, none of the symbol display areas displaying the symbols included in that displayed designated winning symbol combination are associated with a modifier, the gaming system: (a) provides any award associated with that displayed designated winning symbol combination to the player, and (b) associates a modifier with one of the symbol display areas for a subsequent play of the wagering game, as indicated by block 116. The process then returns to block 102.

In another embodiment, diamond 108 and block 110 are not employed. In this embodiment, after the gaming system displays the randomly generated symbols at the symbol display areas, as indicated by block 106, the gaming system determines, for at least one displayed designated winning symbol combination, whether any of the symbol display areas displaying the symbols include in that displayed designated winning symbol combination are associated with a modifier, as indicated by diamond 112. If so, the process continues to block 114; if not, the process continues to block 116.

FIGS. 4, 5, 6, 7, 8, 9, 10, 11, 12, 13, 14, 15, 16, 17, 18, and 19 illustrate screen shots of one example embodiment of the gaming system, gaming device, and method of the present disclosure. The gaming system includes a display device that displays one example embodiment of the game providing modifiers for symbol display areas of the present disclosure. While in this embodiment the game providing modifiers for symbol display areas is a wagering game, it should be appreciated that in other embodiments a wager is not required to play the game providing modifiers for symbol display areas. The game providing modifiers for symbol display areas is sometimes referred to herein as the "wagering game" or "game" for brevity.

The wagering game includes a plurality of different symbols displayable at a plurality of symbol display areas. In this embodiment, a display device 130 adjacently displays symbol display areas 140*a*, 140*b*, 140*c*, 140*d*, 140*e*, 140*f*, 140*g*, 140*h*, 140*i*, 140*j*, 140*k*, 140*l*, 140*m*, 140*n*, and 140*o* in a 3×5 grid or matrix. It should be appreciated that the display device may display any suitable quantity of symbol display areas in any suitable configuration or arrangement.

Display device 130 displays a plurality of paylines, each of which is associated with a different plurality of the symbol display areas. Specifically, payline A 150*a* is associated with symbol display areas 140*a*, 140*b*, 140*c*, 140*d*, and 140*e*; payline B 150*b* is associated with symbol display areas 140*f*, 140*g*, 140*h*, 140*i*, and 140*j*; payline C 150*c* is associated with symbol display areas 140*k*, 140*l*, 140*m*, 140*n*, and 140*o*; payline D 150*d* is associated with symbol display areas 140*a*, 140*g*, 140*m*, 140*i*, and 140*e*; and payline E 150*e* is associated with symbol display areas 140*k*, 140*g*, 140*c*, 140*i*, and 140*o*. For clarity and brevity, payline A 150*a*, payline B 150*b*, payline C 150*c*, payline D 150*d*, and payline E 150*e* are sometimes referred to herein as paylines A, B, C, D, and E.

It should be appreciated that the wagering game may include, and the display device may display, any suitable quantity of paylines. It should also be appreciated that each of the displayed paylines may be associated with any suitable quantity of the symbol display areas. It should further be appreciated that each of the displayed paylines may be associated with any suitable combination of the symbol display areas.

Display device 130 displays a paytable 132 that includes a plurality of winning symbol combinations. Paytable 132 indicates the credit payout associated with each respective winning symbol combination. In this illustrated embodiment, paytable 132 indicates the credit payout associated with each respective winning symbol combination when the maximum wager, which is 5 credits in this embodiment, is placed by a player for a play of the wagering game. More specifically, winning symbol combination SEVEN-SEVEN-SEVEN-SEVEN-SEVEN is associated with an award of 100 credits; winning symbol combination BAR-BAR-BAR-BAR is associated with an award of 50 credits; winning symbol combination TRIPLE CHERRY-TRIPLE CHERRY-TRIPLE CHERRY is associated with an award of 25 credits; and winning symbol combination CHERRY-CHERRY-CHERRY is associated with an award of 10 credits. Certain of the winning symbol combinations included in the paytable are designated winning symbol combinations. In this embodiment, each of the winning symbol combinations illustrated in paytable 132 is a designated winning symbol combination. It should be appreciated that in other embodiments only one, but not more, of the winning symbol combinations is a designated winning symbol combination. It should further be appreciated that in other embodiments a plurality, but not all, of the winning symbol combinations are designated winning symbol combinations.

Display device 130 displays an award indicator or display 136, which indicates any award a player has won during a play of the wagering game; a wager indicator or display 134, which indicates any wager placed by the player for a play of the wagering game; a credit indicator or display 138, which indicates the player's credit balance; and an indication or dialog box 170, which displays instructions or comments related to the wagering game before, during, and/or after play of the wagering game. It should be appreciated that, in certain embodiments, the display device displays one or a plurality of the award indicator, the wager indicator, the credit indicator, and the indication box.

Figure 4:
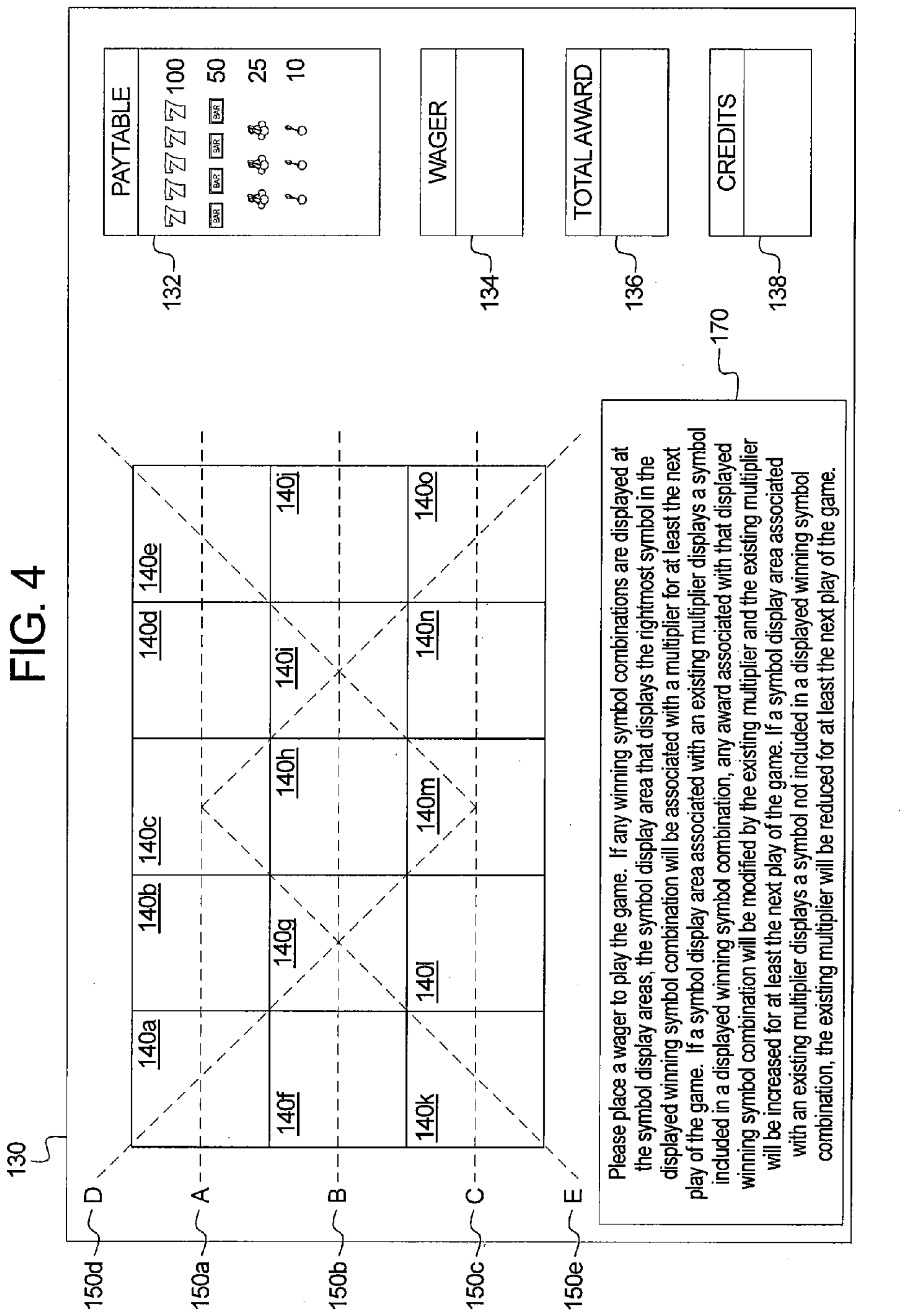
FIGS. 4, 5, 6, 7, 8, 9, 10, 11, 12, 13, 14, 15, 16, 17, 18, and 19 are front views of a display device of the gaming system or gaming device of the present disclosure and illustrating a plurality of consecutive example plays of one embodiment of the game providing modifiers for symbol display areas of the present disclosure.

As illustrated in FIG. 4, when the gaming system is not being played by a player, display device 130 displays an attract screen that includes a welcome message in indication box 170. The welcome message describes the operation of the wagering game, as generally explained below.

During a play of the wagering game, a player places a wager on one or more of the paylines. One of the symbols is randomly generated at each of the symbol display areas. If a designated winning symbol combination is displayed (for example, if the symbol display areas associated with one of the wagered on paylines display the symbols of one of the designated winning symbol combinations), the gaming system determines whether any of the symbol display areas displaying the symbols included in the displayed designated winning symbol combination are associated with an existing modifier. If the gaming system determines that none of the symbol display areas displaying the symbols included in the displayed designated winning symbol combination are associated with an existing modifier, the gaming system: (a) provides the player with an award associated with the displayed designated winning symbol combination, and (b) associates a modifier with one of the symbol display areas for at least one subsequent play of the wagering game. In this embodiment, the gaming system associates the symbol display area displaying the rightmost symbol in the displayed designated winning symbol combination with the modifier for at least one subsequent play of the wagering game. More specifically, in this embodiment, the gaming system associates that symbol display area with a modifier for a minimum quantity of plays of the wagering game, beginning with the subsequent play of the wagering game. In this embodiment, the gaming system associates the symbol display area displaying the rightmost symbol of a displayed designated winning symbol combination with a modifier in the form of a 2× multiplier. Thus, it should be appreciated that only one, but not more, of the symbol display areas is associated with a modifier in this example. It should be appreciated that in other embodiments a plurality, but not all, of the symbol display areas are associated with a modifier. It should also be appreciated that in other embodiments all of the symbol display areas are associated with a modifier.

In this embodiment, the initial minimum quantity of plays of the wagering game (beginning with the subsequent play of the wagering game) in which the modifier is associated with the symbol display area depends upon the quantity of symbols included in the displayed designated winning symbol combination. Here, if the displayed designated winning symbol combination includes three symbols (i.e., the CHERRY-CHERRY-CHERRY and TRIPLE CHERRY-TRIPLE CHERRY-TRIPLE CHERRY designated winning symbol combinations in this example), the initial minimum quantity of plays in which the modifier is associated with the symbol display area is one play. If the displayed designated winning symbol combination includes four symbols (i.e., the BAR-BAR-BAR-BAR designated winning symbol combination in this example), the initial minimum quantity of plays in which the modifier is associated with the symbol display area is two plays. If the displayed designated winning symbol combination includes five symbols (i.e., the SEVEN-SEVEN-SEVEN-SEVEN-SEVEN designated winning symbol combination in this example), the initial minimum quantity of plays in which the modifier is associated with the symbol display area is three plays. It should be appreciated that the initial minimum quantity of plays of the wagering game in which the modifier is associated with the symbol display area may be any suitable quantity of plays.

If the gaming system determines that one or more of the symbol display areas displaying the symbols included in the displayed designated winning symbol combination are associated with an existing modifier, the gaming system: (a) modifies any award associated with the displayed designated winning symbol combination using the existing modifier, (b) provides the player with the modified award, and (c) replaces the existing modifier with a different modifier for at least one subsequent play of the wagering game. In this embodiment, the modifiers are multipliers, and the gaming system replaces the existing multiplier with a multiplier of a higher value. For example, if the existing multiplier is a 2× multiplier, in this embodiment the gaming system replaces that multiplier with a 3× multiplier. As explained above, if the symbol display area displaying the rightmost symbol in the displayed designated winning symbol combination is not associated with an existing modifier, the gaming system associates a new modifier with that symbol display area. If, however, that symbol display area is associated with an existing modifier, the gaming system does not associate any symbol display areas with new modifiers.

The gaming system determines whether any of the symbol display areas that display symbols that are not included in any displayed designated winning symbol combinations are associated with existing modifiers. If so, the gaming system modifies that existing modifier for a subsequent play of the wagering game. In this embodiment, each modifier is associated with a symbol display area for a certain minimum quantity of plays of the wagering game, and the gaming system modifies the modifier by reducing the minimum quantity of plays of the wagering game. Specifically, in this embodiment, the minimum quantity of plays is reduced by one when the symbol display area associated with the modifier does not display a symbol included in any displayed designated winning symbol combination after a random generation of the symbols. In this embodiment, the minimum quantity of plays remains the same (i.e., is not reduced) when the symbol display area associated with the modifier displays a symbol included in a displayed designated winning symbol combination. It should be appreciated that the minimum quantity of plays of the wagering game in which the modifier is associated with the symbol display area may be reduced by any suitable amount.

In one example of this embodiment, a play of the wagering game results in the display of the SEVEN-SEVEN-SEVEN-SEVEN-SEVEN designated winning symbol combination. Since the symbol display area displaying the rightmost SEVEN symbol in that displayed designated winning symbol combination is not associated with an existing modifier, that symbol display area is associated with a modifier in the form of a 2× multiplier. Since the displayed designated winning symbol combination includes five symbols, the minimum quantity of plays of the wagering game in which the 2× multiplier is associated with that symbol display area is three plays. The player wagers on another play of the game, and no designated winning symbol combinations are displayed. Thus, the minimum quantity of plays of the wagering game in which the 2× multiplier is associated with that symbol display area is reduced to two plays. The player wagers on another play of the wagering game, and no designated winning symbol combinations are displayed. Thus, the minimum quantity of plays of the wagering game in which the 2× multiplier is associated with that symbol display area is reduced to one play. The player wagers on another play of the wagering game, and a CHERRY-CHERRY-CHERRY designated winning symbol combination is displayed, and the rightmost CHERRY in the displayed designated winning symbol combination is displayed at the symbol display area associated with the 2× multiplier. Thus, the player wins an award of 20 credits, the multiplier is increased to a 3× multiplier (as explained in detail above), and the minimum quantity of plays of the wagering game in which the 3× multiplier is associated with that symbol display area remains one play (i.e., is not reduced). The player wagers on another play of the wagering game, and no designated winning symbol combinations are displayed. Thus, the minimum quantity of plays of the wagering game in which the 3× multiplier is associated with that symbol display area is reduced to zero plays, and the 3× multiplier is removed from that symbol display area prior to the subsequent play of the wagering game.

Figure 5:
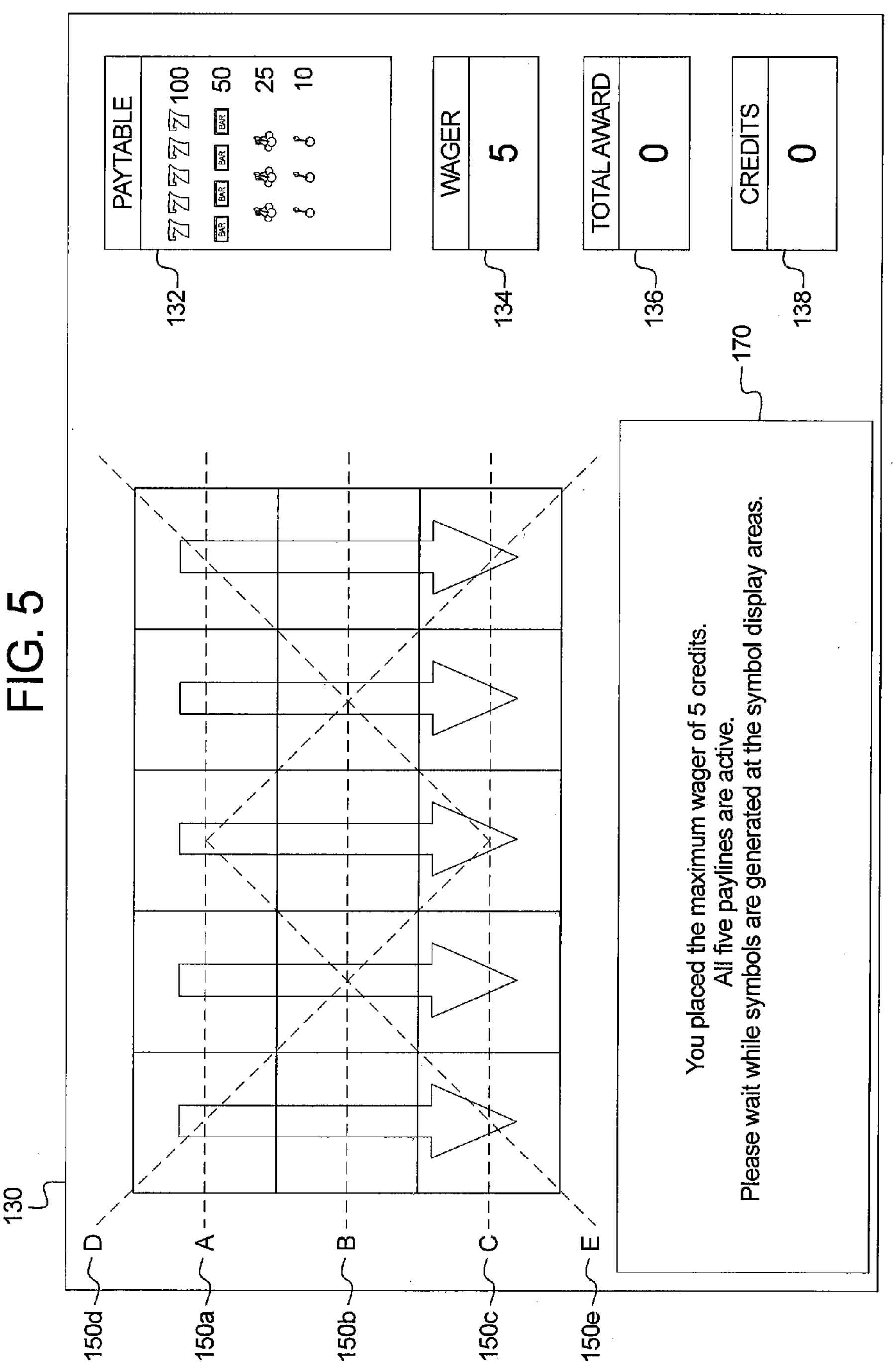

FIGS. 5, 6, 7, 8, 9, 10, 11, 12, 13, 14, 15, 16, 17, 18, and 19 describe a series of consecutive example plays of this embodiment of the wagering game. As illustrated in FIG. 5, a player begins play of the wagering game by placing a wager on one or more of paylines A, B, C, D, and E. In this embodiment, the player has placed the maximum wager of 5 credits, which activates each of the paylines A, B, C, D, and E. The player's wager of 5 credits is indicated in wager indicator 134. Credit indicator 138 displays the player's credit balance of 0 credits.

Figure 6:
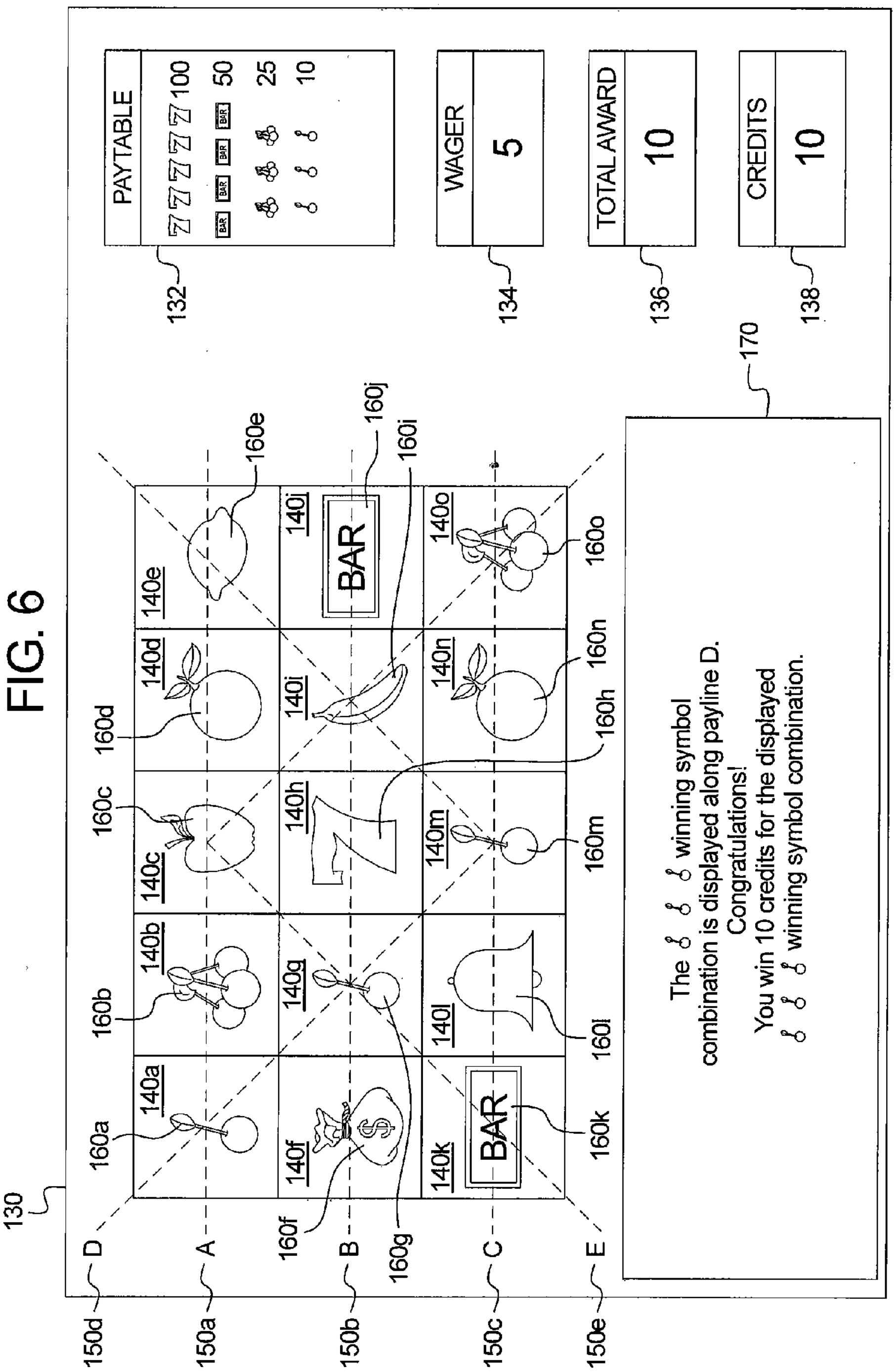

As illustrated in FIG. 6, the gaming system randomly generates symbols 160*a*, 160*b*, 160*c*, 160*d*, 160*e*, 160*f*, 160*g*, 160*h*, 160*i*, 160*j*, 160*k*, 160*l*, 160*m*, 160*n*, and 160*o* at symbol display areas 140*a*, 140*b*, 140*c*, 140*d*, 140*e*, 140*f*, 140*g*, 140*h*, 140*i*, 140*j*, 140*k*, 140*l*, 140*m*, 140*n*, and 140*o*, respectively. Only payline D is associated with a designated winning symbol combination in this example. Specifically, consecutive symbol display areas 140*a*, 140*g*, and 140*m* along payline D display CHERRY symbols 160*a*, 160*g*, and 160*m*, respectively. As indicated in paytable 132, the player wins an award of 10 credits for the displayed CHERRY-CHERRY-CHERRY designated winning symbol combination, and the award is displayed in the award indicator 136. The player's credit balance increases to 10 credits, as indicated by the credit indicator 138.

Figure 7:
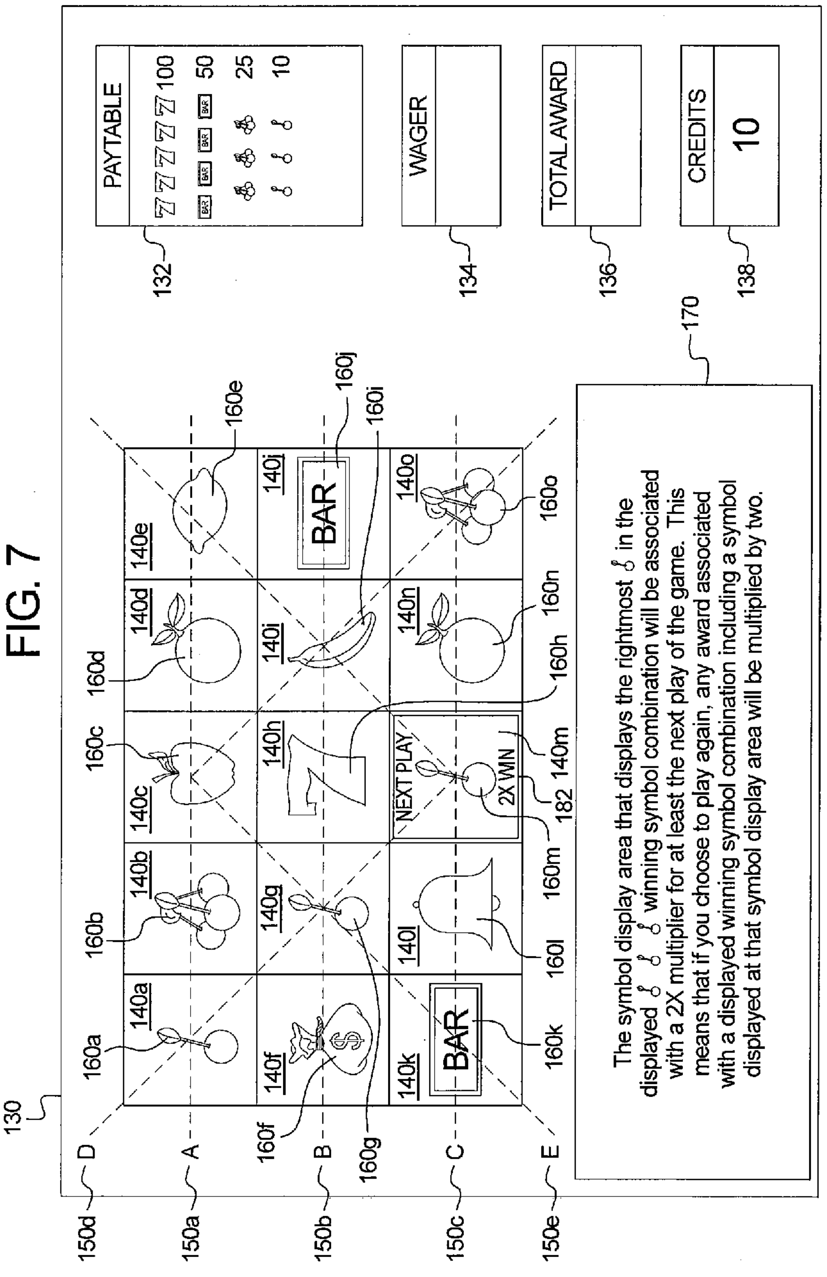

As illustrated in FIG. 7, symbol display area 140*m*, which displays the rightmost CHERRY symbol in the displayed CHERRY-CHERRY-CHERRY designated winning symbol combination, is not associated with an existing award modifier. Accordingly, the gaming system associates an award modifier 182 with symbol display area 140*m*. Since the CHERRY-CHERRY-CHERRY designated winning symbol combination includes three symbols, award modifier 182 will be active for at least the next play of the wagering game if the player chooses to play again. In other words, the initial minimum number of plays of the wagering game that award modifier 182 will be associated with symbol display area 140*m* is one play (starting with the subsequent play of the wagering game). In this embodiment the modifier is a 2× multiplier.

Once a symbol display area is associated with an award modifier, that symbol display area may be visually distinguished from other symbol display areas not associated with an award modifier. For example, as illustrated in FIG. 7, symbol display area 140*m* includes award modifier 182 identified by: (a) an inner box, (b) an indication that the award modifier is active for the next play of the wagering game, and (c) an indication that the award modifier is a 2× multiplier. It should be appreciated that any suitable manner of indicating that a symbol display area is associated with an award modifier may be implemented.

Figure 8:
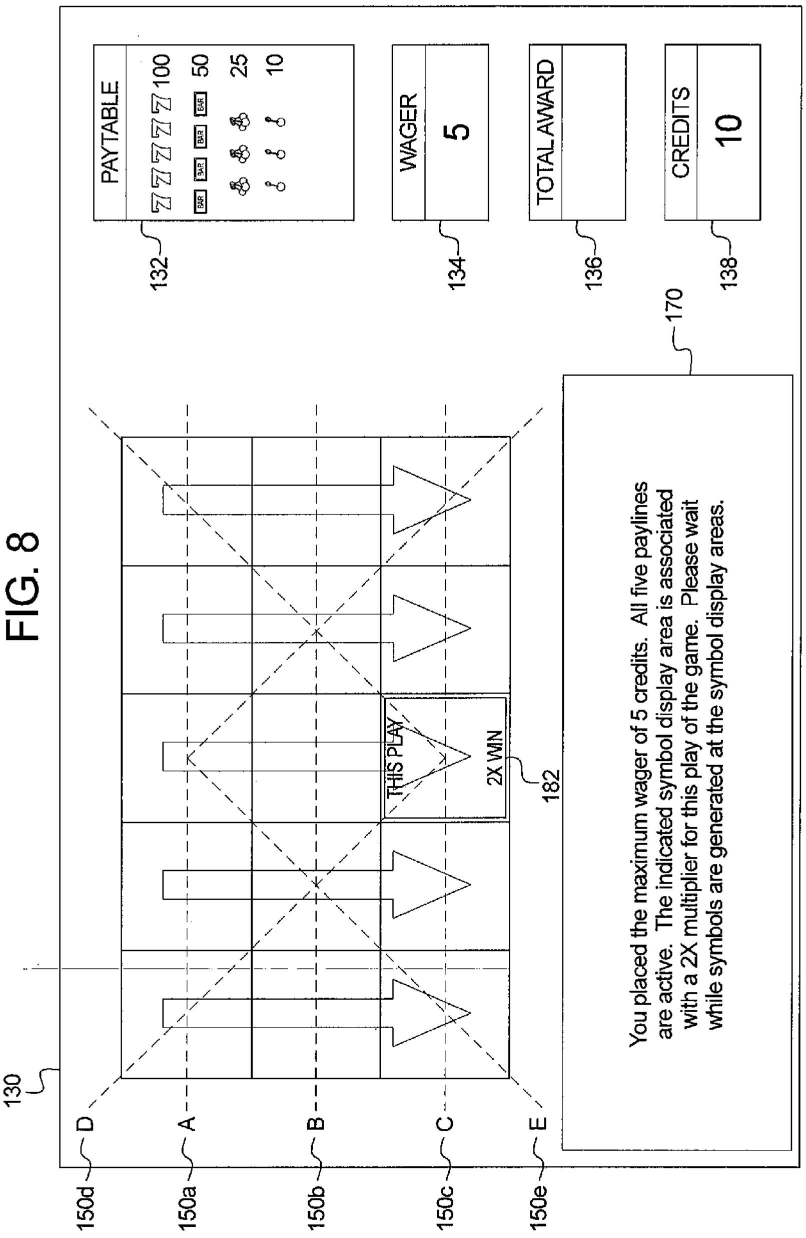

As illustrated in FIG. 8, the player wagered the maximum wager of 5 credits on another play of the wagering game, which activates each of the paylines A, B, C, D, and E. The player's wager is indicated in wager indicator 134. The player's credit balance is reduced to 5 credits, as indicated in credit indicator 138. During this play of the wagering game, symbol display area 140*m* is associated with award modifier 182.

Figure 9:
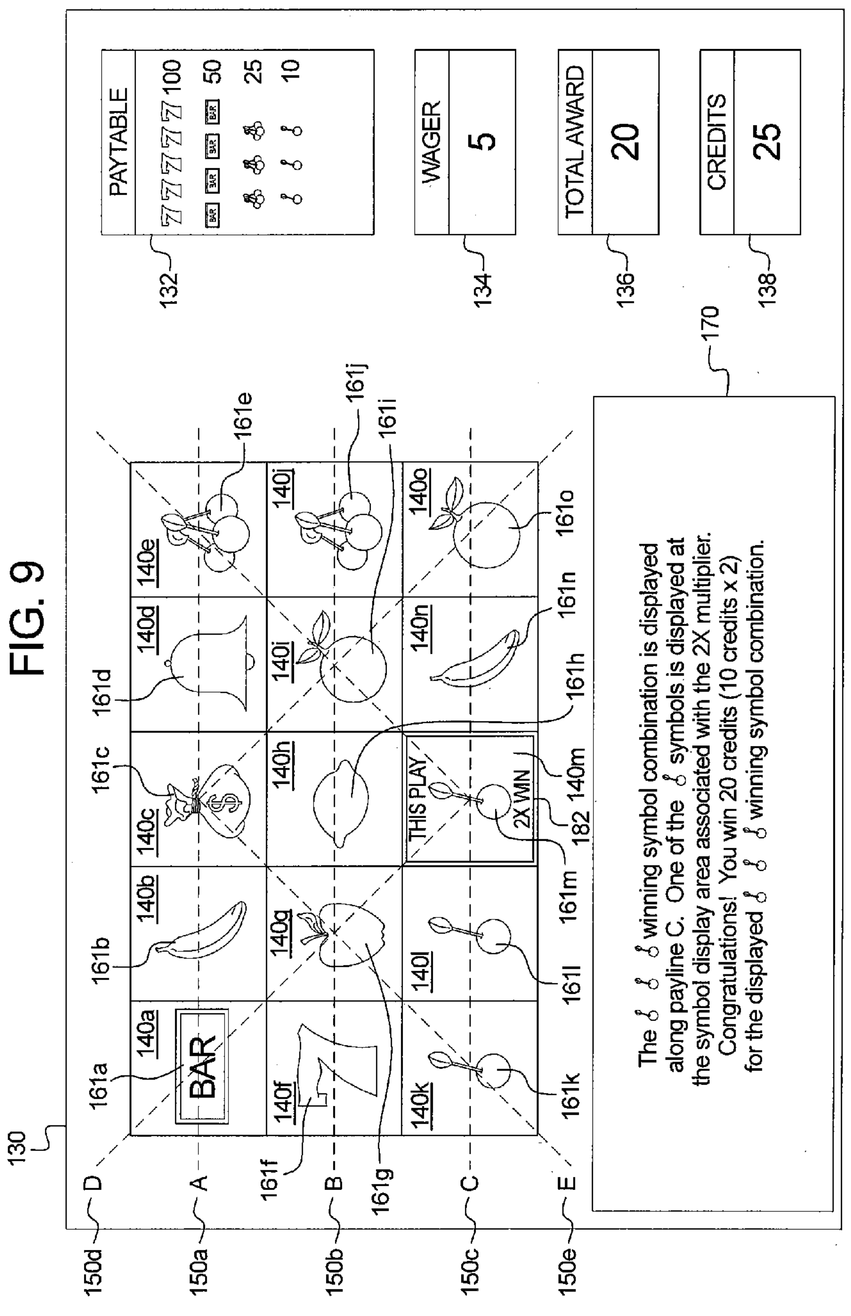

As illustrated in FIG. 9, the gaming system randomly generates symbols 161*a*, 161*b*, 161*c*, 161*d*, 161*e*, 161*f*, 161*g*, 161*h*, 161*i*, 161*j*, 161*k*, 161*l*, 161*m*, 161*n*, and 161*o* at symbol display areas 140*a*, 140*b*, 140*c*, 140*d*, 140*e*, 140*f*, 140*g*, 140*h*, 140*i*, 140*j*, 140*k*, 140*l*, 140*m*, 140*n*, and 140*o*, respectively. Only payline C is associated with a designated winning symbol combination in this example. Specifically, consecutive symbol display areas 140*k*, 140*l*, and 140*m* along payline C display CHERRY symbols 161*k*, 161*l*, and 161*m*, respectively. Symbol display area 140*m*, which displays one of the CHERRY symbols of the displayed CHERRY-CHERRY-CHERRY designated winning symbol combination, is associated with award modifier 182, which is a 2× multiplier. Any award associated with the displayed CHERRY-CHERRY-CHERRY designated winning symbol combination is, therefore, modified using award modifier 182. In this embodiment, the award of 10 credits for the displayed CHERRY-CHERRY-CHERRY designated winning symbol combination is multiplied by 2. The player is provided with a total award of 20 credits, and the award is displayed in award indicator 136. The player's credit balance increases to 25 credits, as indicated by credit indicator 138.

Figure 10:
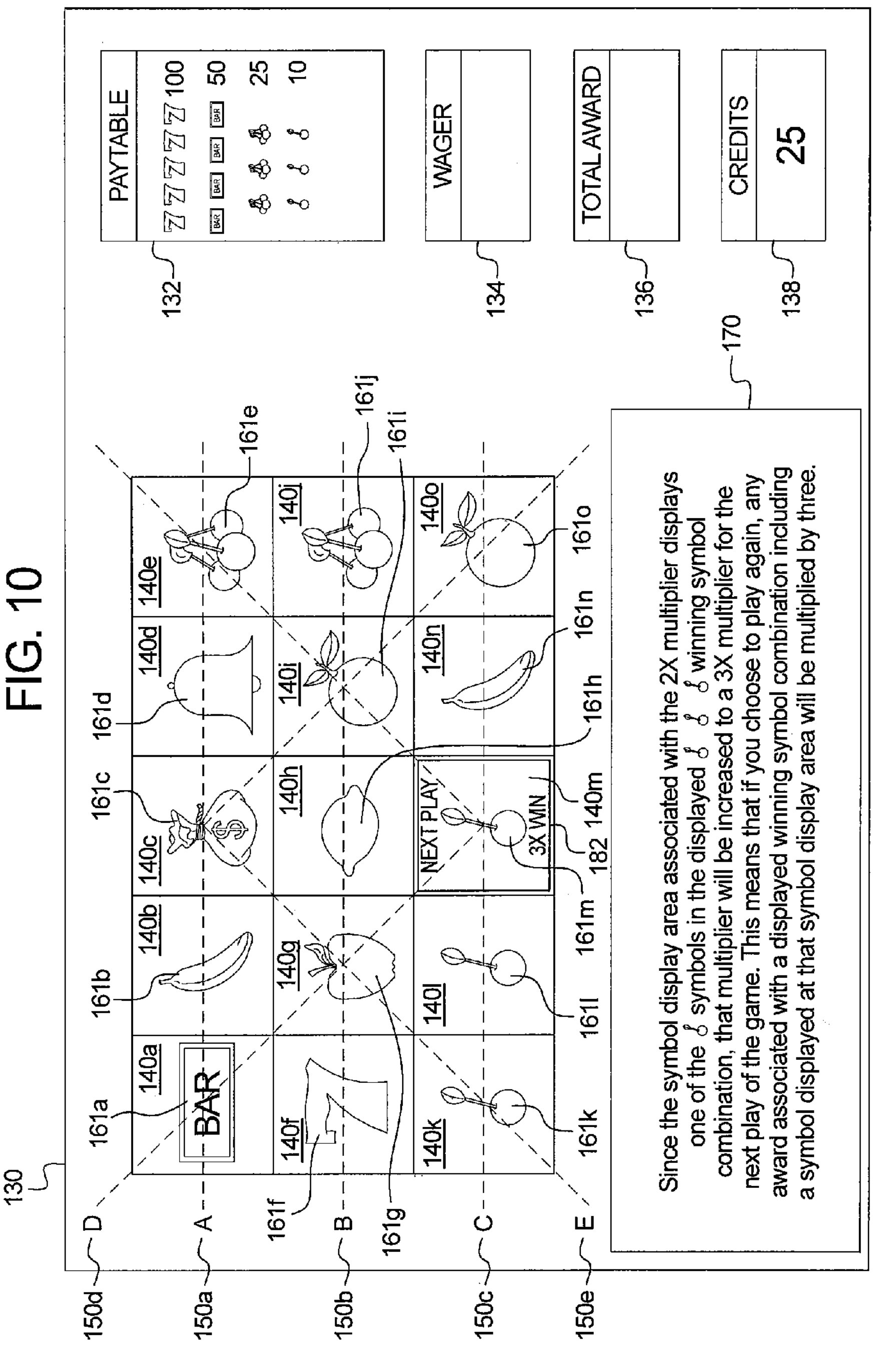

As illustrated in FIG. 10, since symbol display area 140*m* is associated with award modifier 182 and displays symbol 161*m*, which is included in a displayed designated winning symbol combination, the gaming system increases award modifier 182. In this embodiment, the gaming system increases award modifier 182 from a 2× multiplier to a 3× multiplier. Since the symbol display area associated with award modifier 182 displays one of the symbols of a displayed designated winning symbol combination, award modifier 182 will remain active for at least the next play of the wagering game if the player chooses to play again. In other words, the minimum number of plays of the wagering game in which award modifier 182 will be associated with symbol display area 140*m* remains one play (starting with the subsequent play of the wagering game). Since the rightmost CHERRY symbol in the displayed CHERRY-CHERRY-CHERRY designated winning symbol combination is displayed at symbol display area 140*m*, which is already associated with existing award modifier 182, the gaming system does not associate any additional award modifiers with any other symbol display areas in this example.

Figure 11:
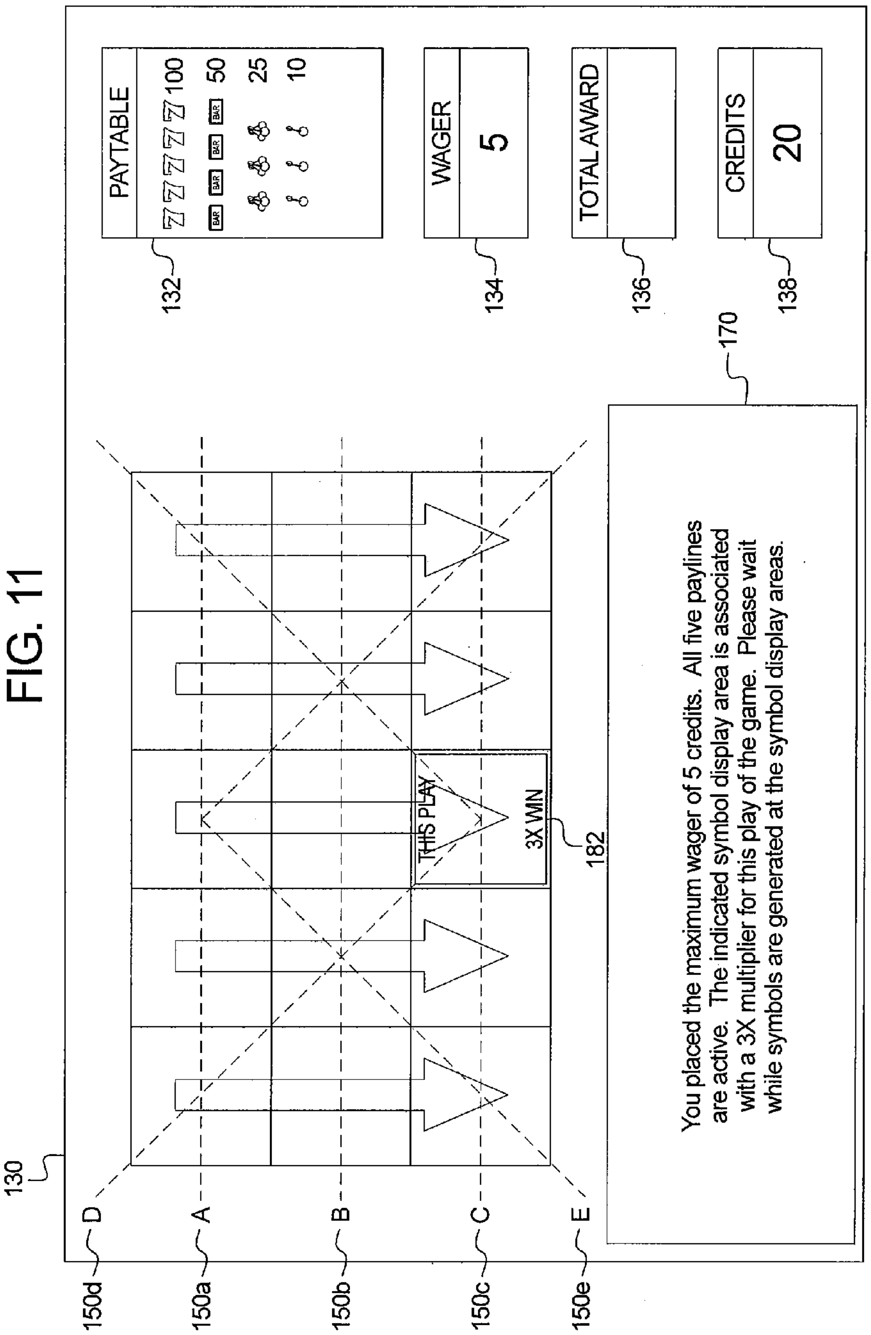

As illustrated in FIG. 11, the player wagered the maximum wager of 5 credits on another play of the wagering game, which activates paylines A, B, C, D, and E. The player's wager is indicated in wager indicator 134. The player's credit balance is reduced to 20 credits, as indicated in credit indicator 138. During this play of the wagering game, symbol display area 140*m* is associated with award modifier 182.

Figure 12:
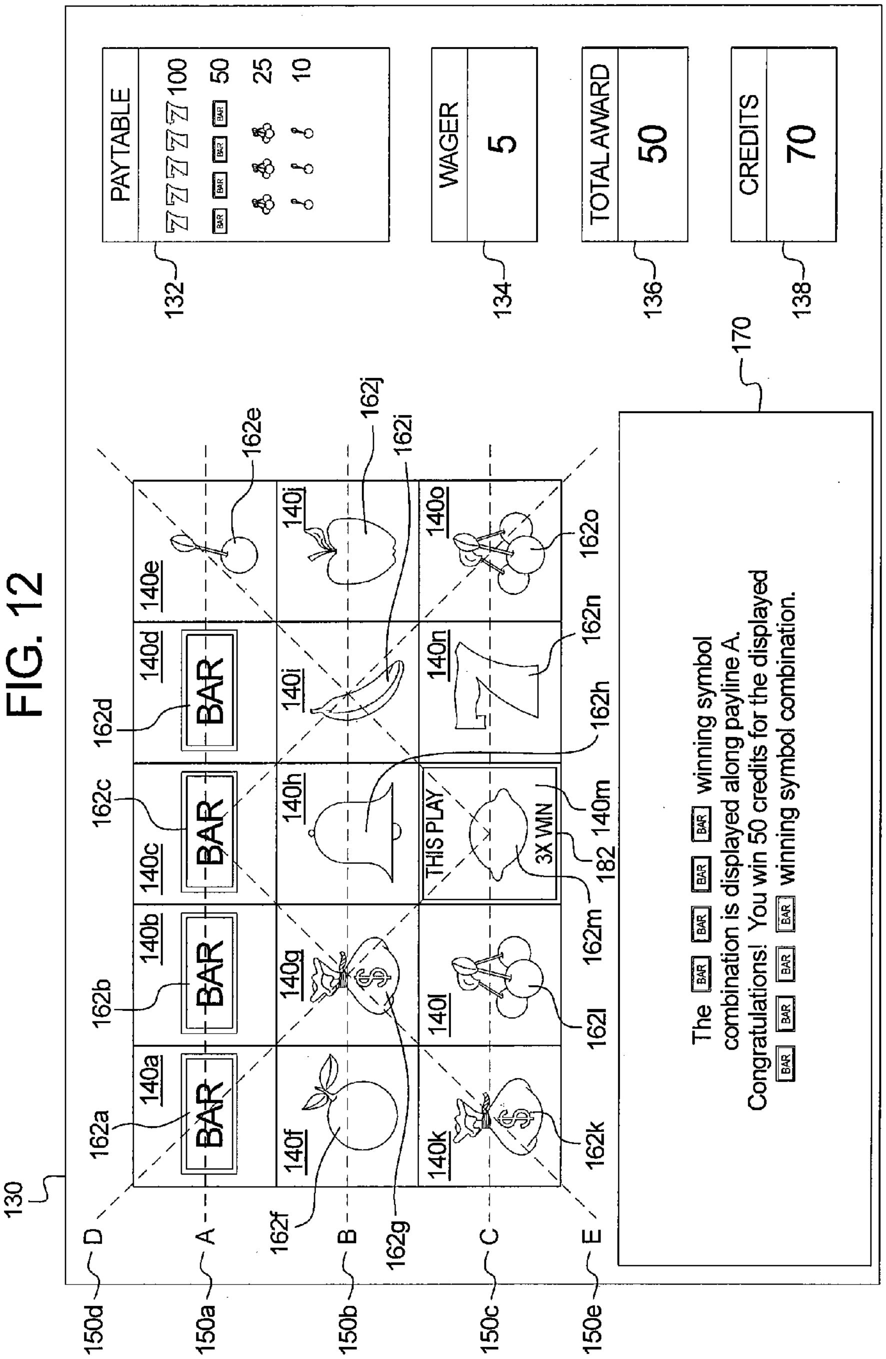

As illustrated in FIG. 12, the gaming system randomly generates symbols 162*a*, 162*b*, 162*c*, 162*d*, 162*e*, 162*f*, 162*g*, 162*h*, 162*i*, 162*j*, 162*k*, 162*l*, 162*m*, 162*n*, and 162*o* at symbol display areas 140*a*, 140*b*, 140*c*, 140*d*, 140*e*, 140*f*, 140*g*, 140*h*, 140*i*, 140*j*, 140*k*, 140*l*, 140*m*, 140*n*, and 1400, respectively. Only payline A is associated with a designated winning symbol combination in this example. Specifically, consecutive symbol display areas 140*a*, 140*b*, 140*c*, and 140*d* along payline A display BAR symbols 162*a*, 162*b*, 162*c*, and 162*d*, respectively. As indicated in paytable 132, the player wins an award of 50 credits for the displayed BAR-BAR-BAR-BAR designated winning symbol combination, and the award is displayed in the award indicator 136. The player's credit balance increases to 70 credits, as indicated by the credit indicator 138.

Figure 13:
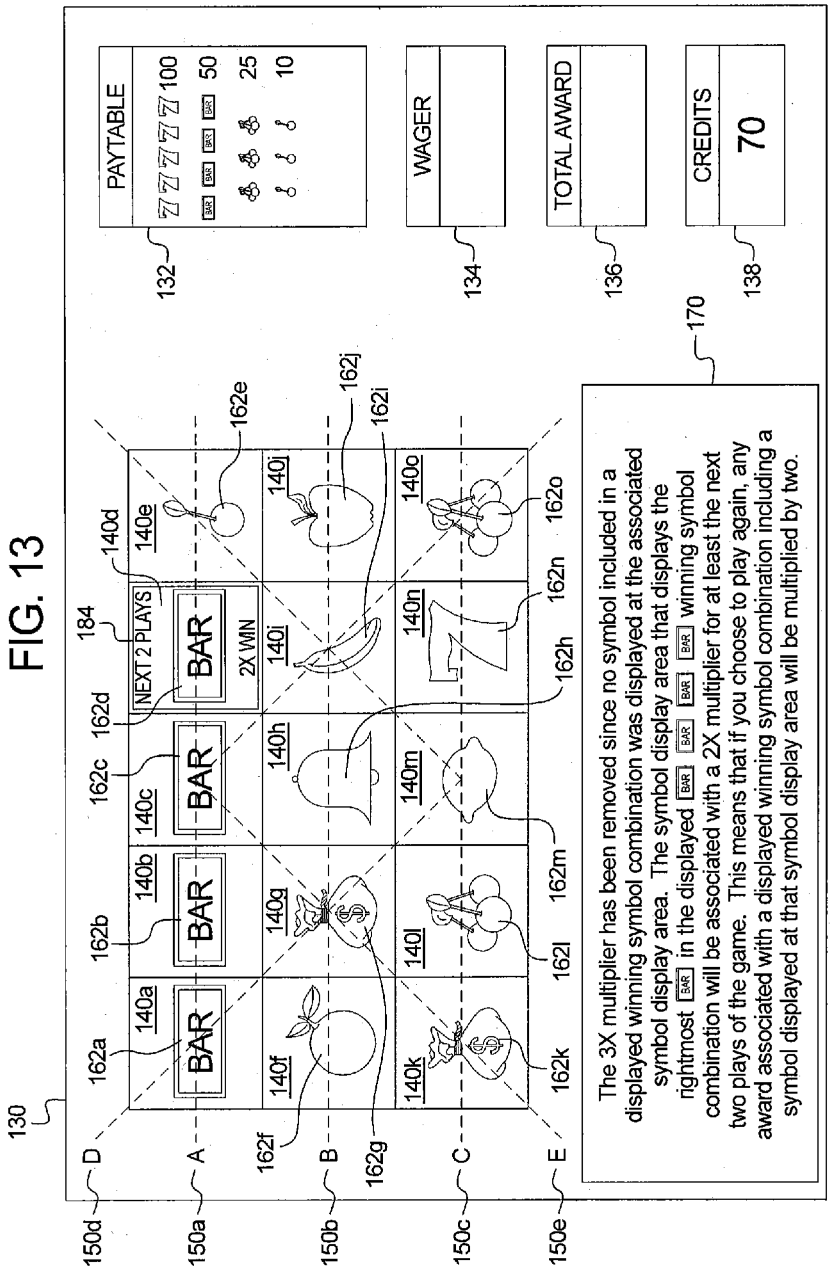

As illustrated in FIG. 13, symbol display area 140*d*, which displays the rightmost BAR symbol in the displayed BAR-BAR-BAR-BAR designated winning symbol combination, is not associated with an existing modifier. Accordingly, the gaming system associates an award modifier 184 with symbol display area 140*d*. Since the BAR-BAR-BAR-BAR designated winning symbol combination includes four symbols, award modifier 184 will be active for at least the next two plays of the wagering game if the player chooses to play again. In other words, the initial minimum number of plays of the wagering game in which award modifier 184 will be associated with symbol display area 140*d* is two plays (starting with the subsequent play of the wagering game). In this embodiment award modifier 184 is a 2× multiplier. Since symbol display area 140*m*, which is associated with award modifier 182, does not display a symbol included in any displayed designated winning symbol combinations, the gaming system reduces the minimum number of plays of the wagering game in which award modifier 182 will be associated with symbol display area 140*m* from one play to zero plays (starting with the subsequent play of the wagering game), meaning that award modifier 182 is removed from symbol display area 140*m*.

Figure 14:
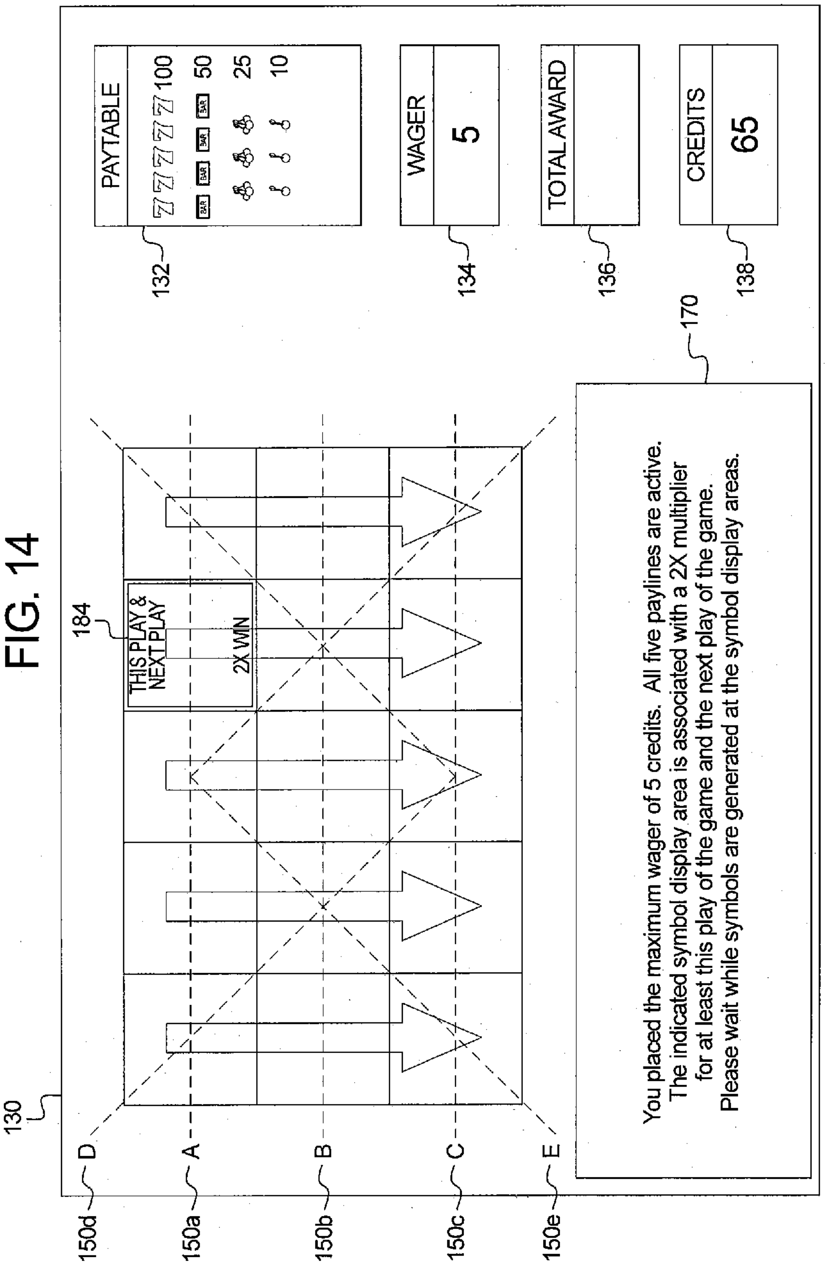

As illustrated in FIG. 14, the player wagered the maximum wager of 5 credits on another play of the wagering game, which activates paylines A, B, C, D, and E. The player's wager is indicated in wager indicator 134. The player's credit balance is reduced to 65 credits, as indicated in credit indicator 138. During this play of the wagering game, symbol display area 140*d* is associated with award modifier 184.

Figure 15:
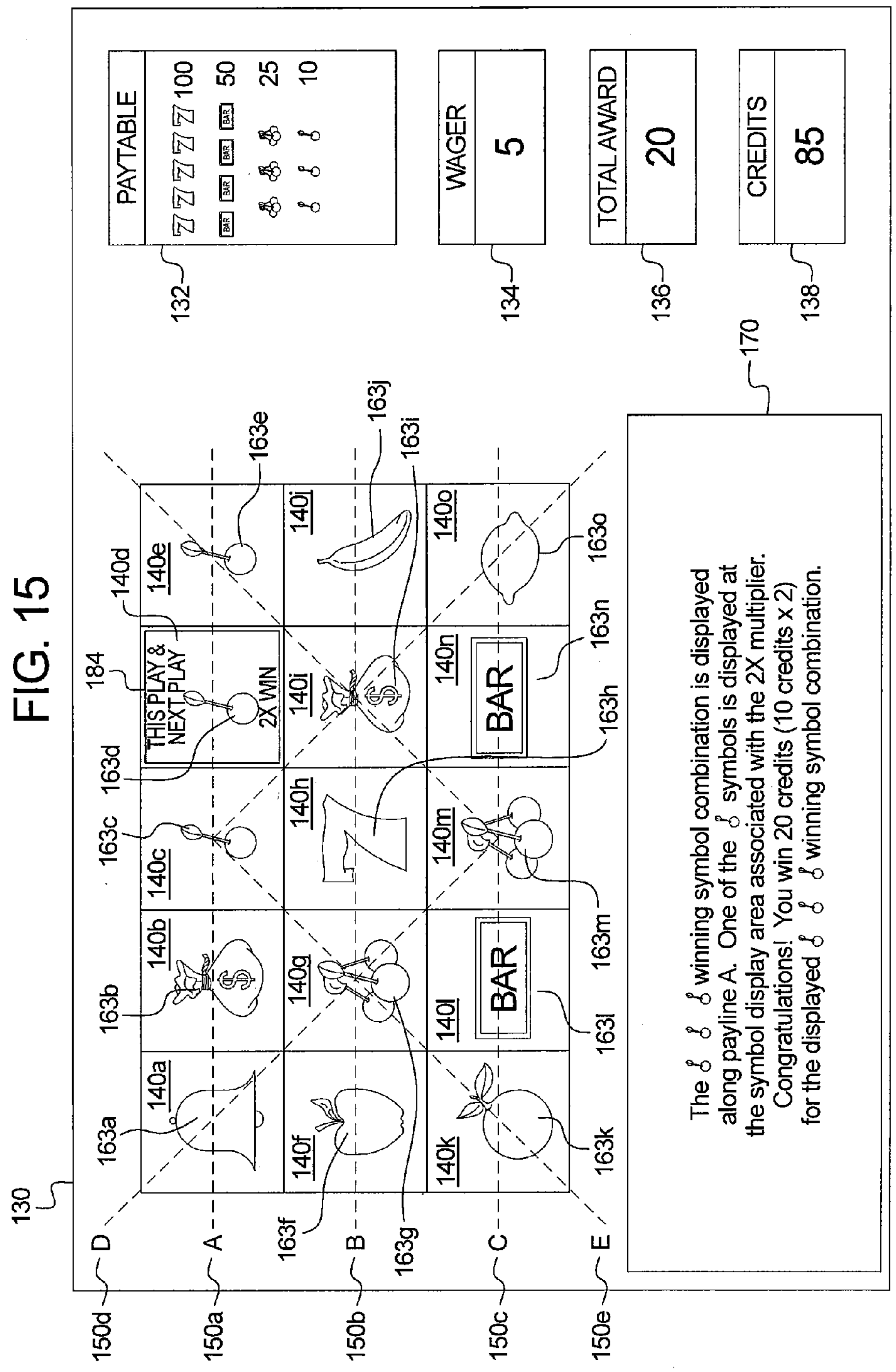

As illustrated in FIG. 15, the gaming system randomly generates symbols 163*a*, 163*b*, 163*c*, 163*d*, 163*e*, 163*f*, 163*g*, 163*h*, 163*i*, 163*j*, 163*k*, 163*l*, 163*m*, 163*n*, and 163*o* at symbol display areas 140*a*, 140*b*, 140*c*, 140*d*, 140*e*, 140*f*, 140*g*, 140*h*, 140*i*, 140*j*, 140*k*, 140*l*, 140*m*, 140*n*, and 140*o*, respectively. Only payline A is associated with a designated winning symbol combination in this example. Specifically, consecutive symbol display areas 140*c*, 140*d*, and 140*e* along payline A display CHERRY symbols 163*c*, 163*d*, and 163*e*, respectively. Symbol display area 140*d*, which displays one of the CHERRY symbols of the displayed CHERRY-CHERRY-CHERRY designated winning symbol combination, is associated with award modifier 184, which is a 2× multiplier. Any award associated with the displayed CHERRY-CHERRY-CHERRY designated winning symbol combination is, therefore, modified using award modifier 184. In this case, the award of 10 credits for the displayed CHERRY-CHERRY-CHERRY designated winning symbol combination is multiplied by 2. The player is provided with a total award of 20 credits, and the award is displayed in the award indicator 136. The player's credit balance increases to 85 credits, as indicated by the credit indicator 138.

Figure 16:
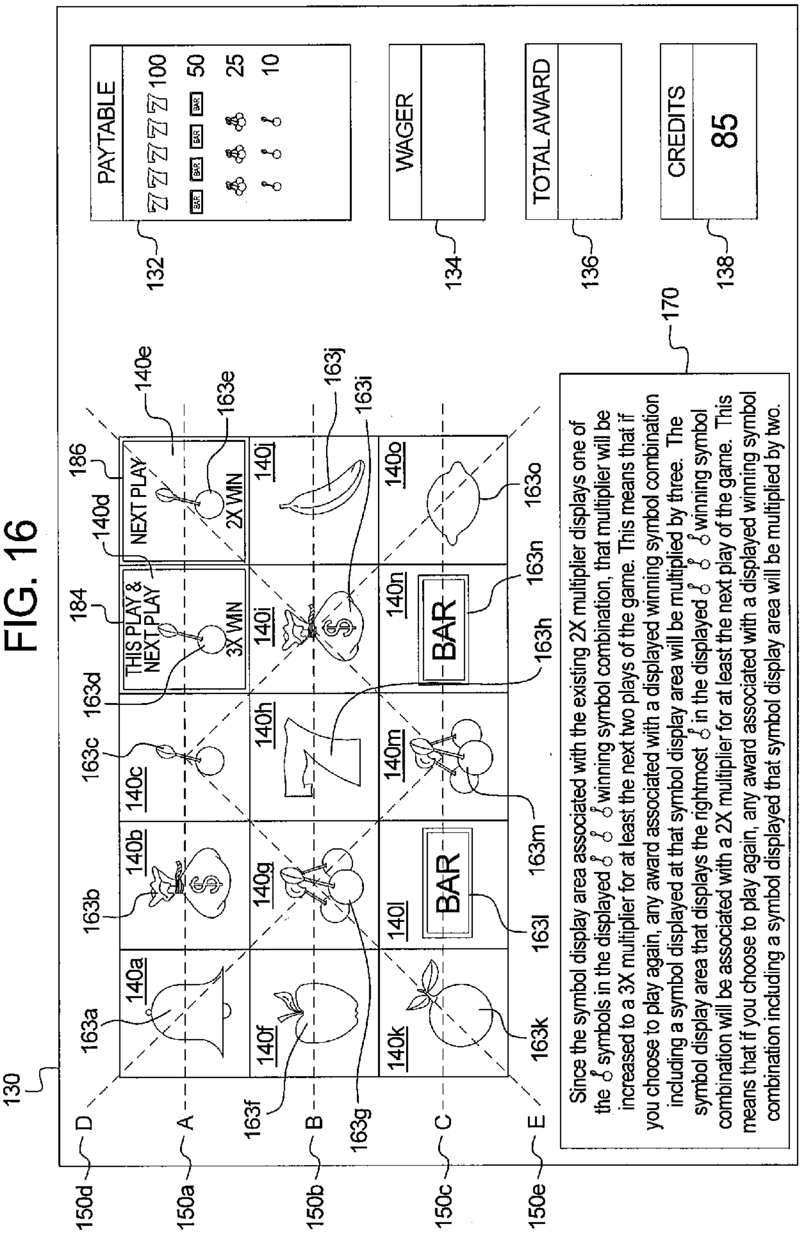

As illustrated in FIG. 16, since symbol display area 140*d* is associated with award modifier 184 and displays symbol 163*d*, which is included in a displayed designated winning symbol combination, the gaming system increases award modifier 184. In this embodiment, the gaming system increases award modifier 184 from a 2× multiplier to a 3× multiplier. Since the symbol display area associated with award modifier 184 displays one of the symbols of a displayed designated winning symbol combination, award modifier 184 will remain active for at least the next two plays of the wagering game if the player chooses to play again. In other words, the minimum number of plays of the wagering game in which award modifier 184 will be associated with symbol display area 140*d* remains two plays (starting with the subsequent play of the wagering game). Symbol display area 140*e*, which displays the rightmost CHERRY symbol in the displayed CHERRY-CHERRY-CHERRY designated winning symbol combination, is not associated with an existing modifier. Accordingly, the gaming system associates an award modifier 186 with symbol display area 140*e*. Since the CHERRY-CHERRY-CHERRY designated winning symbol combination includes three symbols, award modifier 186 will be active for at least the next play of the wagering game if the player chooses to play again. In other words, the initial minimum number of plays of the wagering game in which award modifier 186 will be associated with symbol display area 140*e* is one play (starting with the subsequent play of the wagering game). In this embodiment award modifier 186 is a 2× multiplier.

Figure 17:
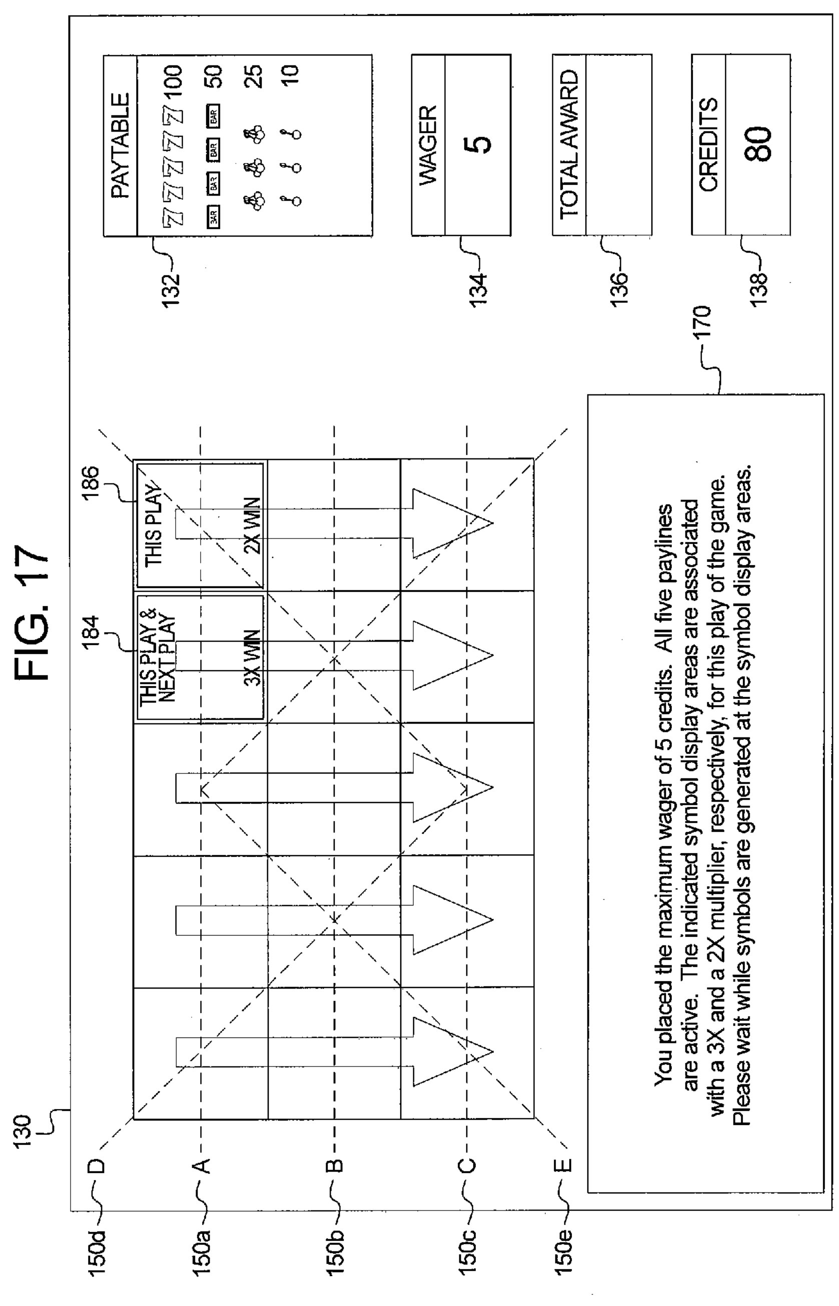

As illustrated in FIG. 17, the player wagered the maximum wager of 5 credits on another play of the wagering game, which activates paylines A, B, C, D, and E. The player's wager is indicated in wager indicator 134. The player's credit balance is reduced to 80 credits, as indicated in credit indicator 138. During this play of the wagering game, symbol display area 140*d* is associated with award modifier 184 and symbol display area 140*e* is associated with award modifier 186.

Figure 18:
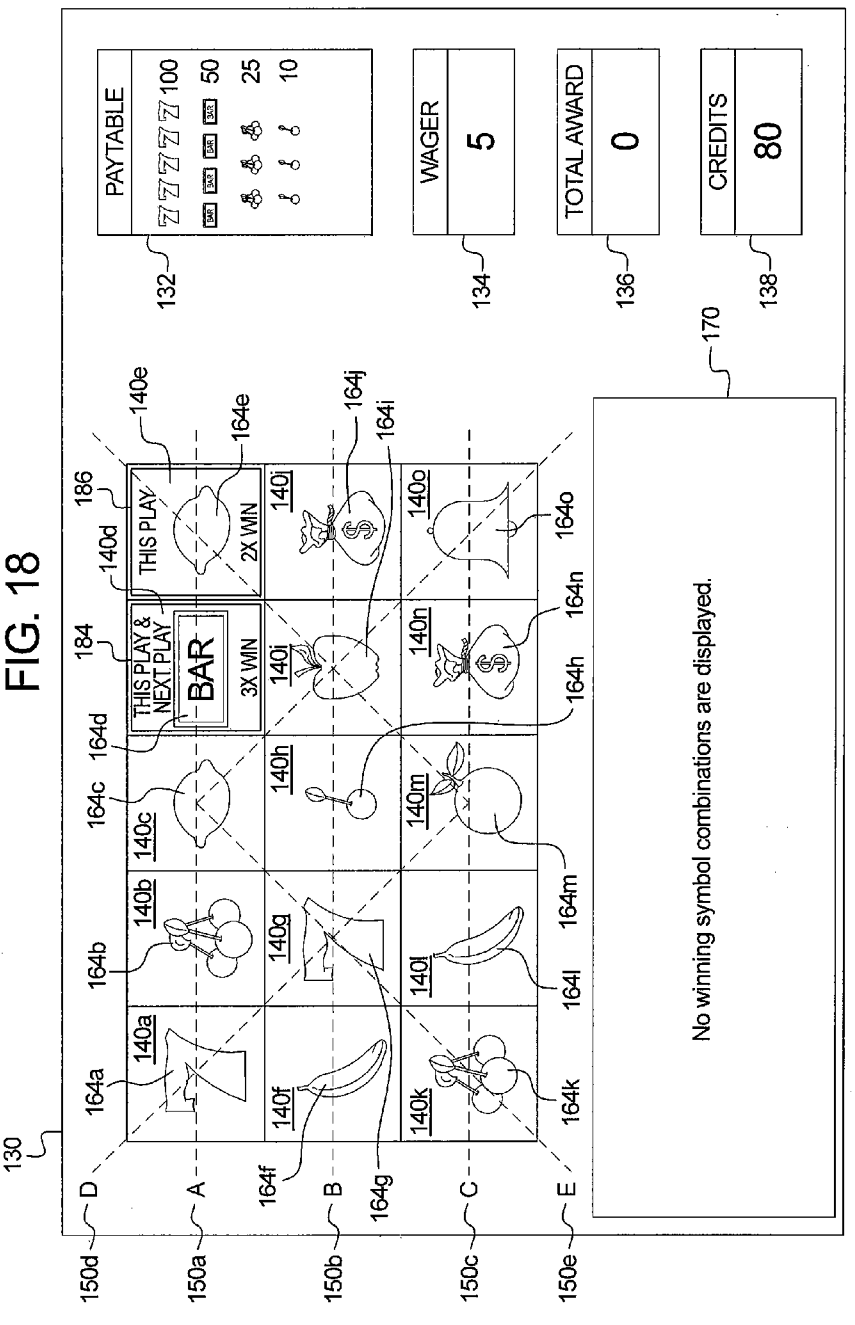

As illustrated in FIG. 18, the gaming system randomly generates symbols 164*a*, 164*b*, 164*c*, 164*d*, 164*e*, 164*f*, 164*g*, 164*h*, 164*i*, 164*j*, 164*k*, 164*l*, 164*m*, 164*n*, and 164*o* at symbol display areas 140*a*, 140*b*, 140*c*, 140*d*, 140*e*, 140*f*, 140*g*, 140*h*, 140*i*, 140*j*, 140*k*, 140*l*, 140*m*, 140*n*, and 140*o*, respectively. None of the paylines are associated with any winning symbol combinations in this example.

Figure 19:
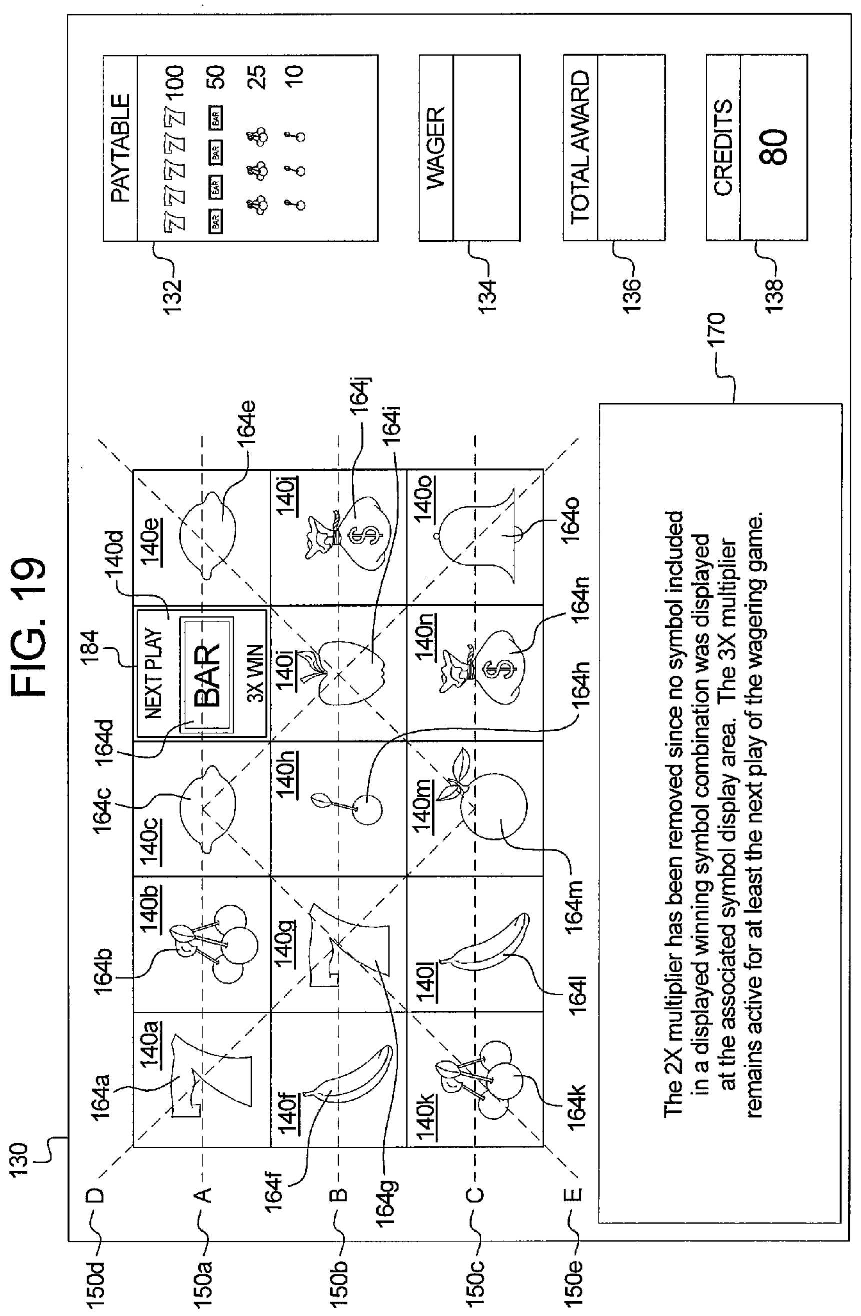

As illustrated in FIG. 19, since symbol display area 140*d*, which is associated with award modifier 184, does not display a symbol included in any displayed designated winning symbol combinations, the gaming system reduces the minimum number of plays of the wagering game that award modifier 184 will be associated with symbol display area 140*d* from two plays to one play (starting with the subsequent play of the wagering game). Thus, award modifier 184 will be associated with symbol display area 140*d* for at least the next play of the wagering game. Since symbol display area 140*e*, which is associated with award modifier 186, does not display a symbol included in any displayed designated winning symbol combinations, the gaming system reduces the minimum number of plays of the wagering game that award modifier 186 will be associated with symbol display area 140*e* from one play to zero plays (starting with the subsequent play of the wagering game), meaning that award modifier 186 is removed from symbol display area 140*e*.

The player chooses not to wager on another play of the wagering game, and the player's interaction with the gaming system ends.

In another embodiment, one of the symbol display areas is a designated symbol display area. In this embodiment, after randomly generating symbols at the symbol display areas, the gaming system determines whether a modifier is associated with the designated symbol display area and, if so, whether the designated symbol display area displays a symbol that is not part of a displayed designated winning symbol combination. If the designated symbol display area is associated with a modifier and displays a symbol that is not part of a displayed designated winning symbol combination, the gaming system reduces the modifier for at least one subsequent play of the wagering game. In one embodiment, for example, the gaming system reduces the minimum quantity of plays of the wagering game in which the modifier is associated with the designated symbol display area by one play.

In this embodiment, if a modifier is associated with the designated symbol display area and the designated symbol display area displays a symbol included in a displayed designated winning symbol combination, the gaming system: (a) modifies any award associated with the displayed designated winning symbol combination using the modifier, (b) provides the modified award to the player, and (c) associates another different modifier with the designated one of the symbol display areas for at least one subsequent play of the wagering game. In one embodiment, for example, if the modifier is a 2× multiplier, the gaming system replaces the 2× multiplier with a multiplier having a higher value, such as a 3× multiplier.

In this embodiment, if no modifier is associated with the designated symbol display area and the designated symbol display area displays a symbol included in a displayed designated winning symbol combination, the gaming system: (a) provides any award associated with the displayed designated winning symbol combination to the player, and (b) associates a modifier with the designated symbol display area for at least one subsequent play of the wagering game. In one embodiment, for example, the gaming system associates a 2× multiplier with the designated symbol display area and sets an initial minimum quantity of plays of the wagering game in which the 2× multiplier is associated with the designated symbol display area to one play (starting with the subsequent play of the wagering game).

It should be appreciated that the designated symbol display area may be selected by the gaming system before, during, or after the symbols are randomly generated for a play of the game. In one embodiment, the designated symbol display area is randomly selected by the gaming system. In another embodiment, the designated symbol display area is predetermined. In another embodiment, the designated symbol display area is selected by the player. In another embodiment, there are a plurality of designated symbol display areas. In one embodiment, when the designated symbol display area displays a symbol included in a displayed designated winning symbol combination, another symbol display area is designated as an additional designated symbol display area for one or more subsequent plays of the wagering game.

It should be appreciated that the gaming system may associate any suitable symbol display area or symbol display areas with a modifier or modifiers for at least one subsequent play of the wagering game. For example, in one embodiment, the gaming system randomly selects one or more of the symbol display areas not already associated with an existing modifier and associates the randomly selected symbol display area(s) with a modifier. In another embodiment, the gaming system enables the player to choose one or more of the symbol display areas to associate with a modifier. In one embodiment, the gaming system randomly selects one or more of the symbol display areas displaying a symbol included in the displayed designated winning symbol combination and associates the randomly selected symbol display area(s) with a modifier. In another embodiment, the gaming system associates the symbol display area displaying the leftmost symbol in the displayed designated winning symbol combination with a modifier. In another embodiment, the symbol display area that the gaming system associates with a modifier is dependent upon the designated winning symbol combination. For example, if a CHERRY-CHERRY-CHERRY designated winning symbol combination is displayed, the gaming system associates a modifier with the symbol display area displaying the middle CHERRY symbol. In another example, if a BAR-BAR-BAR-BAR designated winning symbol combination is displayed, the gaming system associates a modifier with the symbol display area displaying the leftmost BAR symbol. In another embodiment, the symbol display area that the gaming system associates with a modifier is dependent upon the quantity of symbols included in the winning symbol combination. In one embodiment, the gaming system associates a designated symbol display area with a modifier when the designated symbol display area displays a symbol included in a displayed designated winning symbol combination. In this embodiment, the designated symbol display area may be predetermined, randomly determined, selected by a player, or determined in any other suitable manner.

It should be appreciated that the gaming system may associate the symbol display area with any suitable multiplier. In one embodiment, when the gaming system associates a plurality of symbol display areas with a plurality of modifiers, the gaming system associates each or a plurality of those symbol display areas with different modifiers. It should also be appreciated that in certain embodiments the modifier may not be a multiplier, but rather a different type of modifier. In general, a modifier may modify an award by any suitable mathematical operation including addition, subtraction, multiplication, division, and the like. It should be appreciated that a modifier associated with one symbol display area may be different than a modifier associated with another symbol display area. In one embodiment, the initial value of the modifier depends upon the quantity of symbols in the displayed designated winning symbol combination. In another embodiment, the initial value of the modifier depends upon the displayed designated winning symbol combination. In one embodiment, the initial value of the modifier is randomly determined.

It should be appreciated that if a plurality of symbol display areas displaying symbols included in a displayed designated winning symbol combination are each associated with a modifier, the gaming system, in one embodiment, combines the modifiers and uses the combined modifier to modify any award associated with the displayed designated winning symbol combination. The gaming system may combine the modifiers using addition, multiplication, or any other suitable method.

In another embodiment, only one modifier may be active for any given play of the wagering game. In one embodiment, the modifier modifies any awards for the displayed designated winning symbol combinations for the play of the game in which the modifier is associated with the symbol display area. In other words, in this embodiment the modifier is associated with the current play of the game and the subsequent play of the game.

In one embodiment, the initial minimum quantity of plays of the wagering game in which a modifier is associated with a symbol display area depends upon the displayed designated winning symbol combination. In this embodiment, for example, a designated winning symbol combination including three symbols that is rarer than another designated winning symbol combination including three symbols is associated with a greater initial minimum quantity of plays of the wagering game in which a modifier is associated with a symbol display area. In another embodiment, the initial minimum quantity of plays of the wagering game in which a modifier is associated with a symbol display area is randomly determined by the gaming system. In one embodiment, the initial minimum quantity of plays of the wagering game in which a modifier is associated with a symbol display area is the same for each modifier.

In one embodiment, the amount by which the gaming system increases the modifier is based upon the quantity of symbols in the displayed designated winning symbol combination. For example, if a symbol display area associated with a 2× multiplier displays a symbol included in a displayed designated winning symbol combination including three symbols, the gaming system increases the 2× multiplier to a 3× multiplier. If the symbol display area associated with the 2× multiplier displays a symbol included in a displayed designated winning symbol combination including five symbols, the gaming system increases the 2× multiplier to a 5× multiplier. In another embodiment, the amount by which the gaming system increases the modifier is randomly determined. In another embodiment, rather than increasing the modifier or replacing the modifier with a modifier of a different value, the gaming system increases the minimum quantity of plays of the wagering game in which the modifier is associated with the symbol display area. In one embodiment, the gaming system enables the player to choose whether to increase the modifier or the minimum quantity of plays of the wagering game in which the modifier is associated with the symbol display area. In one embodiment, if the symbol display area displaying the rightmost symbol included in a displayed designated winning symbol combination is associated with an existing modifier, the gaming system associates another symbol display area with a modifier. In another embodiment, if the symbol display area displaying the rightmost symbol included in a displayed designated winning symbol combination is associated with an existing modifier, the gaming system increases the modifier in addition to the increase caused by the symbol display area displaying one of the symbols included in the displayed designated winning symbol combination. In another embodiment, the gaming system replaces a modifier with another modifier rather than increasing the modifier.

In another embodiment, rather than reducing the minimum quantity of plays of the wagering game in which the modifier is associated with the symbol display area, the gaming system reduces the value of the modifier or replaces the modifier with a different modifier having a lower value. In one example of this embodiment, if a modifier is a 3× multiplier and the minimum quantity of plays of the wagering game in which the 3× multiplier is associated with the symbol display area is two plays, if the symbol display area does not display a symbol included in a displayed designated winning symbol combination the gaming system reduces the 3× multiplier to a 2× multiplier and the minimum quantity of plays of the wagering game in which the 3× multiplier is associated with the symbol display area remains two plays. In another embodiment, the gaming system reduces both the value of the modifier and the minimum quantity of plays of the wagering game in which the modifier is associated with the symbol display area. In another embodiment, the gaming system enables the player to choose which of: (a) the value of the modifier, and (b) the minimum quantity of plays of the wagering game in which the modifier is associated with the wagering game to reduce. In another embodiment, after a play of the wagering game the gaming system always reduces the minimum quantity of plays of the wagering game in which the modifier is associated with the symbol display area unless: (a) the minimum quantity of plays of the wagering game in which the modifier is associated with the symbol display area is one, and (b) the symbol display area displays a symbol included in a displayed designated winning symbol combination. In another embodiment, the gaming system increases the minimum quantity of plays of the wagering game in which the modifier is associated with the symbol display area when the symbol display area displays a symbol included in a displayed designated winning symbol combination. It should be appreciated that the gaming system may reduce or increase the minimum quantity of plays of the wagering game in which the modifier is associated with the symbol display area by any suitable amount.

In one embodiment, the plurality of symbols includes a WILD symbol. In this embodiment, the gaming system may randomly generate and display the WILD symbol at one of the symbol display areas instead of or in addition to one of the symbols. When a WILD symbol is generated and displayed at one of the symbol display areas, the WILD symbol acts as the symbol that will maximize the player's award. If the gaming system generates and displays the symbols SEVEN-SEVEN-WILD-SEVEN-SEVEN at the symbol display areas along one of the paylines, the WILD symbol acts as the SEVEN symbol, and the player receives the award associated with the SEVEN-SEVEN-SEVEN-SEVEN-SEVEN designated winning symbol combination.

In another embodiment, the gaming system includes a BONUS symbol. In this embodiment, the gaming system may randomly generate and display the BONUS symbol at one of the symbol display areas instead of or in addition to one of the symbols. In one embodiment, the BONUS symbol triggers one or more free plays of a secondary or bonus game, which may be the game providing modifiers for symbol display areas of the present disclosure or any other suitable game. In another embodiment, the gaming system provides the player with a bonus award when the BONUS symbol is generated and displayed at one of the symbol display areas. In another embodiment, the BONUS symbol acts as the WILD symbol described above.

It should be appreciated that the paytable may be modified to reflect lower credit payouts when a wager that is less than the maximum wager is placed by the player. It should be appreciated that any suitable quantity of winning symbol combinations may be used. It should also be appreciated that any suitable combinations of the symbols may be used as winning symbol combinations. It should further be appreciated that the winning symbol combinations may be associated with any suitable credit payouts. It should be appreciated that any suitable quantity of paytables may be used. It should also be appreciated that any suitable symbols may be used. The symbols may include, for example, any suitable markings or indicia such as letters, numbers, or illustrations or pictures of objects.

In another embodiment, the one or more of the designated winning symbol combinations do not have to be winning symbol combinations. In other words, in this embodiment the designated winning symbol combinations are designated symbol combinations that do not result in the player receiving an award when these designated symbol combinations are displayed. In one embodiment, for example, the designated symbol combinations are losing symbol combinations rather than winning symbol combinations.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device storing a plurality of instructions, which when executed by the at least one processor, cause the at least one processor to operate with the at least one display device and the at least one input device to:

(a) display a play of a game, the game including a plurality of different symbols and a plurality of different winning symbol combinations, at least one of the winning symbol combinations being a designated winning symbol combination, the symbols being displayable at a plurality of symbol display areas, wherein the display of said play of the game includes a random generation of a plurality of the symbols and a display of the randomly generated symbols at the symbol display areas;

(b) for said play of the game, if the at least one designated winning symbol combination is displayed, associate and display a first modifier with one of the symbol display areas for a subsequent play of the game;

(c) display said subsequent play of the game; and (d) for said subsequent play of the game, if the at least one designated winning symbol combination is displayed, and if the symbol display area associated with the first modifier displays one of the symbols included in the displayed at least one designated winning symbol combination:

(i) modify any award associated with the displayed at least one designated winning symbol combination using the first modifier;

(ii) cause the modified award to be provided; and (iii) associate and display a second modifier with the symbol display area associated with the first modifier for another subsequent play of the game, the second modifier being greater than the first modifier.

2. The gaming system of claim 1, wherein the plurality of instructions, when executed by the at least one processor, cause the at least one processor to associate the first modifier with one of the symbol display areas displaying one of the symbols of the displayed at least one designated winning symbol combination.

3. The gaming system of claim 1, wherein the plurality of instructions, when executed by the at least one processor, cause the at least one processor to associate the first modifier with a designated one of the symbol display areas displaying one of the symbols of the displayed at least one designated winning symbol combination.

4. The gaming system of claim 1, wherein the first modifier is a multiplier having a first value, and the second modifier is a multiplier having a second value that is greater than the first value.

5. The gaming system of claim 1, wherein the plurality of instructions, when executed by the at least one processor, cause the at least one processor to, for said subsequent play of the game, if the symbol display area associated with the first modifier displays one of the symbols included in the displayed at least one designated winning symbol combination, associate a third modifier with a symbol display area other than the symbol display area associated with the first modifier.

6. The gaming system of claim 5, wherein the symbol display area other than the symbol display area associated with the first modifier is one of the symbol display areas displaying one of the symbols of the displayed at least one designated winning symbol combination.

7. The gaming system of claim 1, wherein the plurality of instructions, when executed by the at least one processor, cause the at least one processor to, for said play of the game, if the at least one designated winning symbol combination is displayed, modify any award associated with the displayed at least one designated winning symbol combination using the first modifier and cause the modified award to be provided.

8. The gaming system of claim 1, wherein the first modifier is associated with said symbol display area for a minimum quantity of plays of the game, the minimum quantity being at least one.

9. The gaming system of claim 1, wherein a plurality of the winning symbol combinations are designated winning symbol combinations.

10. The gaming system of claim 1, wherein the plurality of instructions, when executed by the at least one processor, cause the at least one processor to, for said subsequent play of the game, if the at least one designated winning symbol combination is displayed, and if the symbol display area associated with the first modifier does not display one of the symbols included in the displayed at least one designated winning symbol combination, disassociate the first modifier from said symbol display area.

11. A method of operating a gaming system, said method comprising:

(a) causing at least one processor to execute a plurality of instructions stored in at least one memory device to operate with at least one display device to display a play of a game, the game including a plurality of different symbols and a plurality of different winning symbol combinations, at least one of the winning symbol combinations being a designated winning symbol combination, the symbols being displayable at a plurality of symbol display areas, wherein the display of said play of the game includes a random generation of a plurality of the symbols and a display of the randomly generated symbols at the symbol display areas;

(b) causing the at least one processor to execute the plurality of instructions to operate with the at least one display device to, for said play of the game, if the at least one designated winning symbol combination is displayed, associate and display a first modifier with one of the symbol display areas for a subsequent play of the game;

(c) causing the at least one processor to execute the plurality of instructions to operate with the at least one display device to display said subsequent play of the game; and (d) for said subsequent play of the game, if the at least one designated winning symbol combination is displayed, and if the symbol display area associated with the first modifier displays one of the symbols included in the displayed at least one designated winning symbol combination:

(i) causing the at least one processor to execute the plurality of instructions to modify any award associated with the displayed at least one designated winning symbol combination using the first modifier;

(ii) causing the at least one processor to execute the plurality of instructions to cause the modified award to be provided; and (iii) causing the at least one processor to execute the plurality of instructions to operate with the at least one display device to associate and display a second modifier with the symbol display area associated with the first modifier for another subsequent play of the game, the second modifier being greater than the first modifier.

12. The method of claim 11, which includes causing the at least one processor to execute the plurality of instructions associate the first modifier with one of the symbol display areas displaying one of the symbols of the displayed at least one designated winning symbol combination.

13. The method of claim 11, which includes causing the at least one processor to execute the plurality of instructions to associate the first modifier with a designated one of the symbol display areas displaying one of the symbols of the displayed at least one designated winning symbol combination.

14. The method of claim 11, wherein the first modifier is a multiplier having a first value, and the second modifier is a multiplier having a second value that is greater than the first value.

15. The method of claim 11, which includes causing the at least one processor to execute the plurality of instructions to, for said subsequent play of the game, if the symbol display area associated with the first modifier displays one of the symbols included in the displayed at least one designated winning symbol combination, associate a third modifier with a symbol display area other than the symbol display area associated with the first modifier.

16. The method of claim 15, wherein the symbol display area other than the symbol display area associated with the first modifier is one of the symbol display areas displaying one of the symbols of the displayed at least one designated winning symbol combination.

17. The method of claim 11, which includes causing the at least one processor to execute the plurality of instructions to, for said play of the game, if the at least one designated winning symbol combination is displayed, modify any award associated with the displayed at least one designated winning symbol combination using the first modifier and cause the modified award to be provided.

18. The method of claim 11, wherein the first modifier is associated with said symbol display area for a minimum quantity of plays of the game, the minimum quantity being at least one.

19. The method of claim 11, wherein a plurality of the winning symbol combinations are designated winning symbol combinations.

20. The method of claim 11, which includes causing the at least one processor to execute the plurality of instructions to, for said subsequent play of the game, if the at least one designated winning symbol combination is displayed, and if the symbol display area associated with the first modifier does not display one of the symbols included in the displayed at least one designated winning symbol combination, disassociate the first modifier from said symbol display area.

21. The method of claim 11, which is provided through a data network.

22. The method of claim 21, wherein the data network is the internet.

23. A non-transitory computer readable medium including a plurality of instructions which, when executed by at least one processor, cause the at least one processor to:

(a) cause at least one display device to display a play of a game, the game including a plurality of different symbols and a plurality of different winning symbol combinations, at least one of the winning symbol combinations being a designated winning symbol combination, the symbols being displayable at a plurality of symbol display areas, wherein the display of said play of the game includes a random generation of a plurality of the symbols and a display of the randomly generated symbols at the symbol display areas;

(b) for said play of the game, if the at least one designated winning symbol combination is displayed, associate and cause the at least one display device to display a first modifier with one of the symbol display areas for a subsequent play of the game;

(c) cause the at least one display device to display said subsequent play of the game; and (d) for said subsequent play of the game, if the at least one designated winning symbol combination is displayed, and if the symbol display area associated with the first modifier displays one of the symbols included in the displayed at least one designated winning symbol combination:

(i) modify any award associated with the displayed at least one designated winning symbol combination using the first modifier;

(ii) cause the modified award to be provided; and (iii) associate and cause the at least one display device to display a second modifier with the symbol display area associated with the first modifier for another subsequent play of the game, the second modifier being greater than the first modifier.

24. The non-transitory computer readable medium of claim 23, wherein the plurality of instructions, when executed by the at least one processor, cause the at least one processor to associate the first modifier with one of the symbol display areas displaying one of the symbols of the displayed at least one designated winning symbol combination.

25. The non-transitory computer readable medium of claim 23, wherein the plurality of instructions, when executed by the at least one processor, cause the at least one processor to associate the first modifier with a designated one of the symbol display areas displaying one of the symbols of the displayed at least one designated winning symbol combination.

26. The non-transitory computer readable medium of claim 23, wherein the first modifier is a multiplier having a first value, and the second modifier is a multiplier having a second value that is greater than the first value.

27. The non-transitory computer readable medium of claim 23, wherein the plurality of instructions, when executed by the at least one processor, cause the at least one processor to, for said subsequent play of the game, if the symbol display area associated with the first modifier displays one of the symbols included in the displayed at least one designated winning symbol combination, associate a third modifier with a symbol display area other than the symbol display area associated with the first modifier.

28. The non-transitory computer readable medium of claim 27, wherein the symbol display area other than the symbol display area associated with the first modifier is one of the symbol display areas displaying one of the symbols of the displayed at least one designated winning symbol combination.

29. The non-transitory computer readable medium of claim 23, wherein the plurality of instructions, when executed by the at least one processor, cause the at least one processor to, for said play of the game, if the at least one designated winning symbol combination is displayed, modify any award associated with the displayed at least one designated winning symbol combination using the first modifier and cause the modified award to be provided.

30. The non-transitory computer readable medium of claim 23, wherein the first modifier is associated with said symbol display area for a minimum quantity of plays of the game, the minimum quantity being at least one.

31. The non-transitory computer readable medium of claim 23, wherein a plurality of the winning symbol combinations are designated winning symbol combinations.

32. The non-transitory computer readable medium of claim 23, wherein the plurality of instructions, when executed by the at least one processor, cause the at least one processor to, for said subsequent play of the game, if the at least one designated winning symbol combination is displayed, and if the symbol display area associated with the first modifier does not display one of the symbols included in the displayed at least one designated winning symbol combination, disassociate the first modifier from said symbol display area.

* * * * *

UNITED STATES PATENT AND TRADEMARK OFFICE

CERTIFICATE OF CORRECTION

PATENT NO. : 8,678,908 B2
APPLICATION NO. : 13/237448
DATED : March 25, 2014
INVENTOR(S) : Mark C. Nicely It is certified that error appears in the above-identified patent and that said Letters Patent is hereby corrected as shown below:

IN THE CLAIMS

In Claim 12, Column 34, Line 20, after "instructions" insert --to--.
In Claim 22, Column 35, Line 4, replace "the" with --an--.

Signed and Sealed this
Fifth Day of August, 2014

Michelle K. Lee

Michelle K. Lee
*Deputy Director of the United States Patent and Trademark Office*